(12) United States Patent
Warris et al.

(10) Patent No.: US 6,604,131 B1
(45) Date of Patent: Aug. 5, 2003

(54) METHOD AND SYSTEM FOR DISTRIBUTING A WORK PROCESS OVER AN INFORMATION NETWORK

(75) Inventors: Ronald W. Warris, Chestermere Lake (CA); William David Paterson, Calgary (CA); John Wester, Calgary (CA)

(73) Assignee: Net Shepherd, Inc. (CA)

( * ) Notice: Subject to any disclaimer, the term of this patent is extended or adjusted under 35 U.S.C. 154(b) by 0 days.

(21) Appl. No.: 09/298,055

(22) Filed: Apr. 22, 1999

(51) Int. Cl.[7] .............................................. G06F 13/00
(52) U.S. Cl. ...................... 709/205; 709/202; 709/219; 709/224; 709/203
(58) Field of Search ............................. 709/202, 203, 709/205, 217, 219, 223, 224, 225, 313, 329

(56) References Cited

U.S. PATENT DOCUMENTS

| | | | | |
|---|---|---|---|---|
| 5,884,282 A | * | 3/1999 | Robinson | 705/27 |
| 5,950,172 A | * | 9/1999 | Klingman | 705/26 |
| 5,983,220 A | * | 11/1999 | Schmitt | 707/5 |
| 6,157,618 A | * | 12/2000 | Boss et al. | 370/252 |
| 6,183,260 B1 | * | 2/2001 | Clark et al. | 434/322 |

OTHER PUBLICATIONS

Cranor, L.F., et al., "A Catalog of Tools that Support Parents' Ability to Choose Online Content Appropriate for their Children", *Technology Inventory*, Nov. 1997, pp. 1–13, XP002184382. (Retrieved from the Internet).

"Net Shephard World Opinion Rating Service", *Technology Inventory*, Nov. 1997, pp. 1–2, XP002184383. (Retrieved from the Internet).

Miller, J., et al., Rating Services and Rating Systems (and Their Machine Readable Description), REC–PICS–Services–961–31, vol. 1, No. 1, No. 1, Oct. 31, 1996, pp. 1–17, XP002184384 (Retrieved from the Internet).

Hoashi, K., et al., "Data Collection for Evaluating Automatic Filtering of Hazardous WWW Information," Proceedings of 1999 Internet Workshop, Osaka, Japan, Feb. 18–20, 1999, pp. 157–164.

Hill, W., et al., "Recommending and Evaluating Choices In A Virtual Community of Use", Proceeding of Conference on Human Factors and Computing Systems, pp. 1–10, (Retrieved from the Internet on Nov. 29, 2001).

* cited by examiner

*Primary Examiner*—Viet D. Vu
(74) *Attorney, Agent, or Firm*—Katten Muchin Zavis Rosenman

(57) ABSTRACT

A system and method for distributing a work process on an information network comprises a first subsystem to contract members of a virtual community having access to the information network to perform tasks associated with the work process, the members having an interest in the work process. A second subsystem dispatches tasks to the members requiring the members to evaluate information accessible on the information network and receive the evaluations of the members. A third subsystem processes the evaluations to perform the work process.

38 Claims, 17 Drawing Sheets

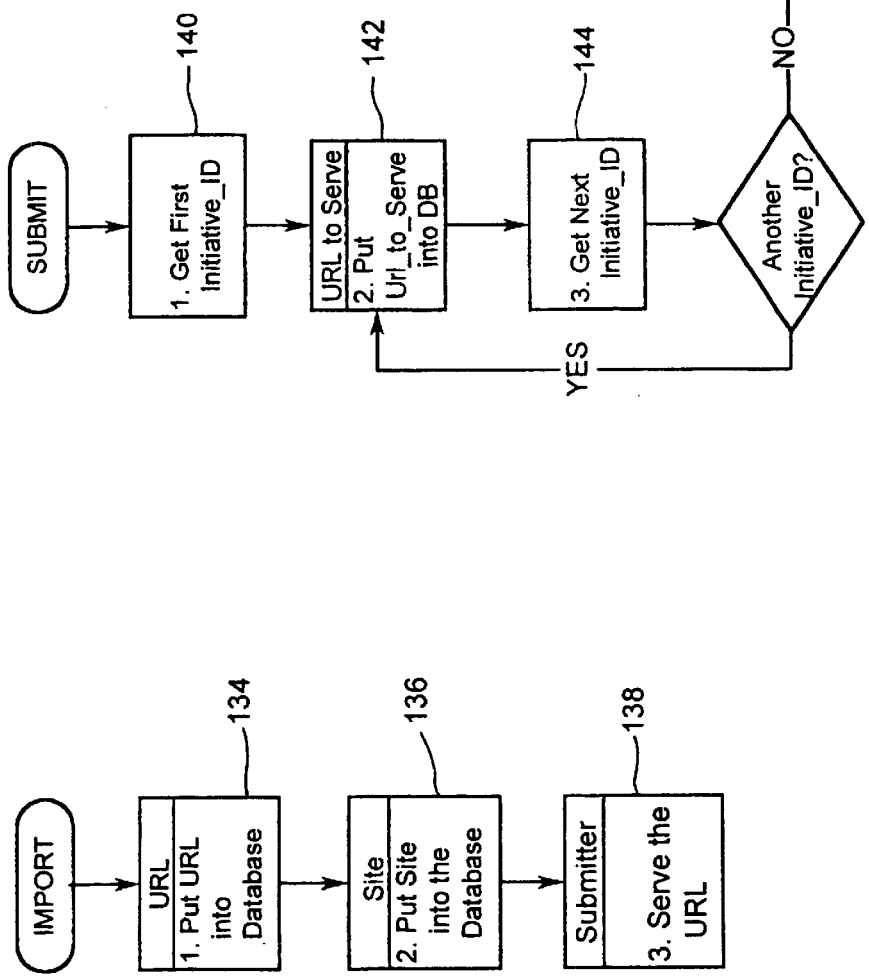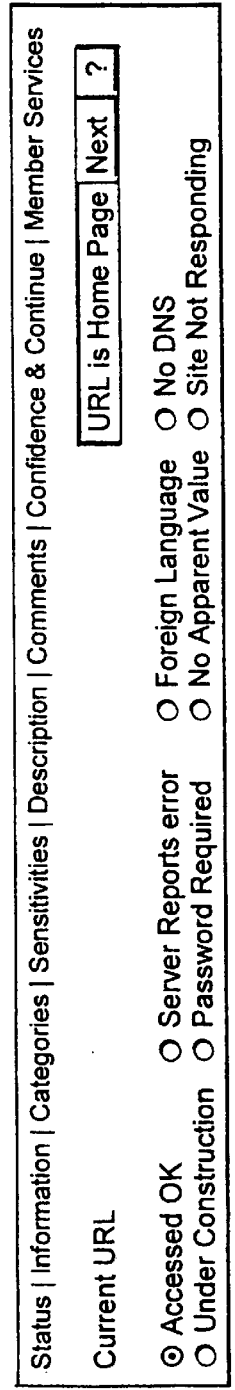

Consider the attribute Maturity Level.
Allowable values are 0: General, 1: Child, 2: Pre-Teen, 3: Teen, 4: Adult.
After the serving process, 25 ballots have been received.

Scenario A: Majority
The ballot distribution is as follows:

| ATTRIBUTE VALUE | VOTES |
|---|---|
| 0 | 6 |
| 1 | 5 |
| 2 | 5 |
| 3 | 5 |
| 4 | 4 |

In this case, the URL would be rated as General.

Scenario B: Tie

| ATTRIBUTE VALUE | VOTES |
|---|---|
| 0 | 5 |
| 1 | 5 |
| 2 | 5 |
| 3 | 5 |
| 4 | 5 |

In this case, the URL would be re-served until one value had a maximum number of votes.

Scenario C: Tie

| ATTRIBUTE VALUE | VOTES |
|---|---|
| 0 | 10 |
| 1 | 10 |
| 2 | 5 |
| 3 | 5 |
| 4 | 0 |

In this case, the URL would be re-served until one value had the maximum number of votes.

FIG. 8a

Consider the attribute Maturity Level.
Allowable values are 0: General, 1: Child, 2: Pre-Teen, 3: Teen, 4: Adult.
After the serving process, 26 ballots have been received, and 50% of the popular vote is required.

Scenario A: Majority
The ballot distribution is as follows:

| ATTRIBUTE VALUE | VOTES |
|---|---|
| 0 | 13 |
| 1 | 3 |
| 2 | 6 |
| 3 | 3 |
| 4 | 1 |

In this case, the URL would be rated as General.

Scenario B: Tie

| ATTRIBUTE VALUE | VOTES |
|---|---|
| 0 | 12 |
| 1 | 11 |
| 2 | 3 |
| 3 | 0 |
| 4 | 0 |

In this case, the URL would be re-served until one value achieved 50% of the vote.

Scenario C: Tie

| ATTRIBUTE VALUE | VOTES |
|---|---|
| 0 | 13 |
| 1 | 13 |
| 2 | 0 |
| 3 | 0 |
| 4 | 0 |

In this case, the URL would be re-served until one value achieved 50% of the vote.

FIG. 8b

Consider the attribute Maturity Level.
Allowable values are 1: General, 2: Child, 3: Pre-Teen, 4: Teen, 5: Adult.

Scenario A
The ballot distribution is as follows:

| ATTRIBUTE VALUE | VOTES |
|---|---|
| 1 | 13 |
| 2 | 3 |
| 3 | 6 |
| 4 | 3 |
| 5 | 1 |

Weighted Average: 2.07
In this case, the URL would be rated as Child.

Scenario B
The ballot distribution is as follows:

| ATTRIBUTE VALUE | VOTES |
|---|---|
| 1 | 8 |
| 2 | 3 |
| 3 | 8 |
| 4 | 6 |
| 5 | 1 |

Weighted Average: 2.57
In this case, the URL would be rated as Pre-Teen.

FIG. 8c

METHOD AND SYSTEM FOR DISTRIBUTING A WORK PROCESS OVER AN INFORMATION NETWORK

FIELD OF THE INVENTION

The present invention relates to a method and system for distributing a work process over an information network to members of a virtual community.

BACKGROUND OF THE INVENTION

In many business environments, work processes are split up into segments and distributed to a number of employees. Each employee is responsible for completing their segment of the work process. The segments are collected as they are completed and when all of the segments are completed, the work process is considered to have been completed.

The tasks required to complete segments of a work process often can be repetitive and boring to employees. Employees having no or little interest in their tasks, are typically less productive and difficult to keep. As a result, staffing difficulties can arise resulting in delays in the completion of work processes. Also, the costs associated with employing a large number of individuals to handle distributed work processes can be significant. Accordingly, there is a need for improving the manner in which distributed work processes are performed.

It is therefore an object of the present invention to provide a novel distributed work process method and system.

SUMMARY OF THE INVENTION

According to one aspect of the present invention there is provided a method of distributing a work process on an information network comprising the steps of:

contracting members of a virtual community having access to said information network to perform tasks associated with said work process, said members having an interest in said work process;

dispatching tasks to said members requiring said members to evaluate information accessible on said information network;

receiving the evaluations of said members; and processing the evaluations to perform said work process.

According to another aspect of the present invention there is provided a system for distributing a work process on an information network comprising:

a first subsystem to contract members of a virtual community having access to said information network to perform tasks associated with said work process, said members having an interest in said work process;

a second subsystem to dispatch tasks to said members requiring said members to evaluate information accessible on said information network and receive the evaluations of said members; and a third subsystem to process the evaluations to perform said work process.

According to still yet another aspect of the present invention there is provided a method for assigning a generic rating to a directory containing a plurality of documents comprising the steps of:

evaluating documents in said directory one at a time and assigning a rating value to said documents;

as said quantitative values are assigned to said documents, comparing said rating values;

if said rating values are the same and after a predetermined percentage of the total number of documents in said directory have been evaluated, assigning a generic rating value to said directory that is the same as said rating values and ending the document evaluation.

The present invention provides advantages in that information accessible over the information network such as the Internet can be evaluated according to desired criteria. The desired criteria may require the information to be evaluated for accuracy and/or may require members to assign quantitative and/or subjective ratings based on content. If pages of websites are to be evaluated in order to assign maturity ratings, the maturing ratings can be used with filtering software to block access to websites containing objectionable material. The present invention also provides advantages in that errors ratings assigned to information can be detected and corrected quickly.

The present invention also provides advantages in that since virtual communities are used to evaluate information accessible via the Internet, rating biases are reduced and a degree of humanity is brought to the process. Also, a large amount of information can be evaluated at a relatively low cost.

BRIEF DESCRIPTION OF THE DRAWINGS

A preferred embodiment of the present invention will now be described more fully with reference to the accompanying drawings in which:

FIGS. 4a to 4d are flowcharts illustrating steps performed by the data loading subsystem of FIG. 3;

FIG. 6 is a screen shot of an URL rating panel presented to members by the ballot collecting subsystem of FIG. 5;

FIGS. 8a to 8c illustrate ballot rating methods used by the Internet characterization system of FIG. 2;

DETAILED DESCRIPTION OF THE PREFERRED EMBODIMENT

The present invention relates generally to a method and system for distributing a work process over an information network. In order to perform the work process, members of a virtual community having access to the information network are contracted if they are qualified and interested in participating in the work process. The qualified members may or may not have prior experience with the work process to be performed or the contractor of the work process. Since qualified members have the option to participate in the work process, members opting to participate in the work process typically have an interest in the work process. Once the qualified and interested members have been contracted, tasks are allocated to the members one at a time.

During performance of the tasks, members are asked to evaluate information accessible over the information network according to the desired criteria. Depending on the work process, the desired criteria may require the information to be evaluated for accuracy and/or may require members to assign quantitative and/or subjective ratings based on content. If the content is being evaluated for accuracy, evaluation of the same content by one or perhaps two members, may only be required. If the evaluation of the content is based on subjective criteria, evaluations of the same content from a significant number of members may be required.

As the tasks are completed by the members, the results are returned over the information network to the system and collected. The results are then processed to satisfy the work process and the members are compensated primarily on a completed task basis.

Since only qualified members are given the opportunity to participate in the work process and since qualified members have the option to participate, when a member opts to participate, the quality of their work product and their motivation level is typically high. Also, since virtually any cyberspace user having access to the information network can potentially qualify as a member, member availability to complete work processes is significant. In addition, since members are primarily compensated on a task completed basis, overheads associated with full or part-time employment are avoided.

The present method and system can be used to perform many different work processes that lend themselves to being distributed over an information network to qualified members. A specific example of the present method and system relating to a system to evaluate information accessible over rate Internet content will now be described with reference to FIGS. 1 to 15.

Figure 1:
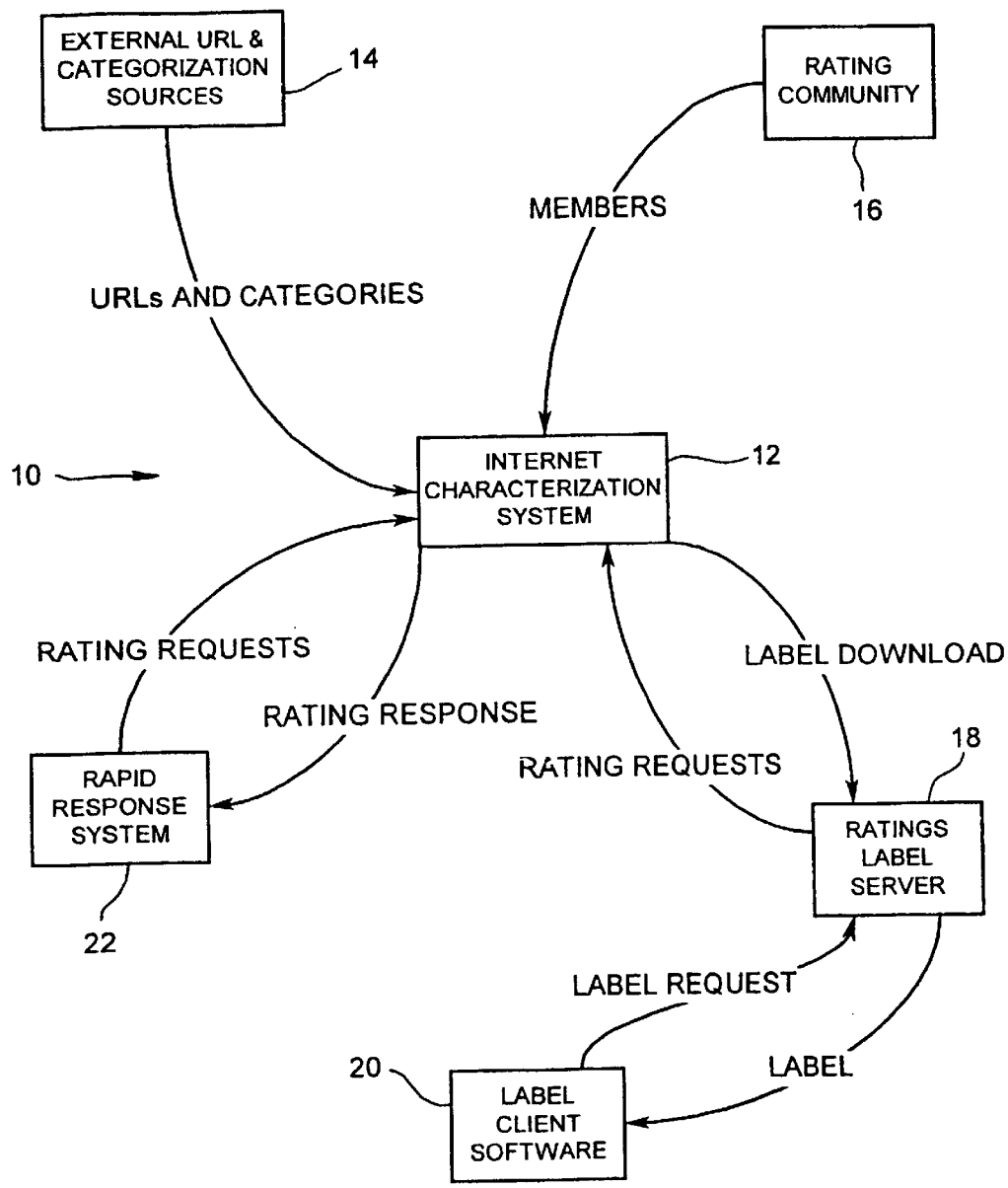
FIG. 1 is a schematic representation of a system to evaluate information accessible via the Internet in accordance with the present invention.

Turning now to FIG. 1, a system to evaluate information accessible over an information network such as the Internet is shown and is generally indicated to by reference numeral 10. System 10 is client-server based and includes a number of components running applications on servers. As can be seen, system 10 includes an Internet characterization system (ICS) 12 receiving information concerning the location of Internet content to be evaluated such as uniform resource locators (URLs) and Categories (collectively referred to as URLs) from a variety of sources 14. ICS 12 provides URLs to a rating community (RC) 16 for Internet content assessment and generates rating labels for the URLs based on the rating community assessment. ICS 12 also communicates with a ratings label server (RLS) 18. RLS 18 delivers the rating labels to client software 20. A rapid response system (RRS) 22 can be accessed by web users and members of the RC 16 and communicates with the ICS 12 to allow rating labels assigned to URLs to be re-accessed.

The rating community 16 includes one or more virtual communities. Each virtual community is comprised of a plurality of members having qualifications suitable to complete an initiative forming part of the work process to be performed. Individuals wishing to become members of the rating community 16 must answer questionnaires and undergo and pass training. The answers to the questionnaires and the training results are stored by the ICS 12 in member profiles. The work process histories of the members are also stored by the ICS 12 in the member profiles. This member profile information is used to assign members indicative ratings. The initiative ratings are used to determine if members qualify for initiatives. In the present example, the work process involves the building of a database storing rating labels for URLs and the initiatives involve the subjective rating of Internet content. Depending on the criteria by which the Internet content is to be rated i.e. maturity level, quality etc., the qualified members forming the virtual community may differ. Although the Internet content in this example is being evaluated to assign subjective ratings to Internet content, it will be appreciated that the Internet content can be evaluated according to virtually any desired criteria.

The ICS 12 learns of the existence of URLs 14 from a variety of sources, such as search engines, newsgroups crawls, customer supplied URLs etc. and generates data representing each URL 14 in a common format. The ICS 12 dispatches URLs to members of the virtual community following a set of rules that are dependent on the virtual community, the work process or project and the initiatives. The set of rules typically determines which members are qualified to rate the URLs as well as the criteria by which the URLs are to be rated. The set of rules also determines the priority of the work process and the initiatives. As mentioned above, depending on the work process, the qualified members may vary. For example, if Internet content is being rated for the complexity of text, qualified members may be limited to those with university degrees in the technology of interest. If Internet content is being evaluated for its appeal to young adults, qualified members may be limited to those under a specified age.

When members receive the URLs, the members, in turn, visit the pages of the websites associated with the URLs and provide "ballots" to the ICS 12. The ballots include the members' ratings of the visited website pages based on criteria defined by the initiative. The criteria for which members assign rating values are referred to as ballot attributes. During this process, the ICS 12 monitors the behavior of the members to ensure valid and honest ballots are being produced.

After the ballots have been received, the ICS 12 renders the ballots and any machine ratings to the websites using a set of rules dependent on the virtual community and the initiatives to generate a rating label for each URL. The rating labels are then sent to the RLS 18 where the rating labels are stored. Users can send requests to the RLS for rating labels assigned to URLs via their client software 20. When the RLS 18 receives a rating label request, the RLS sends the rating label associated with the URL of interest to the user.

If a rating label request for an URL is received and the RLS 18 does not store a rating label for the URL, the RLS sends a rapid response label request to the ICS 12. When the ICS receives the rapid response label request, the ICS 12 dispatches the URL to the RC 16 on a priority basis for rating by members of the virtual community. When the ICS receives the ballots from the members of the virtual community, the ICS 12 generates a rating label for the URL and sends the rating label to the RLS 18 for storage. The RLS 18, in turn, provides the rating label to the user.

If a user accessing the RLS 18 via client software 20 believes an incorrect rating label has been assigned to an URL, the user can use the RRS 22 to get the URL rating re-accessed. When the RRS 22 is accessed by a user, the RRS sends a rapid starting request to the ICS 12. When the ICS 12 receives a rapid rating request, the ICS 12 dispatches the URL to the RC 16 for rating by the members of the virtual community on a priority basis. When the ICS receives the ballots from the members of the virtual community, the ICS 12 generates a rapid response rating label for the URL and sends the rapid response rating label to the RRS 22. The RRS in turn provides the rapid response rating label to the user. The RLS 18 monitors the RRS 22 and updates the rating label stored therein when the RRS generates a rapid response rating label.

When the ICS 12 receives either a request for a rapid response label or a rapid rating sequence, the goal for the ICS is to generate a response as fast as possible and preferably within one hour. As will be appreciated, this allows a user to retrieve rating label information concerning information accessible via the Internet quickly. Further specifics of the system 10 and the components thereof will now be described.

Internet Characterization System

Figure 2:
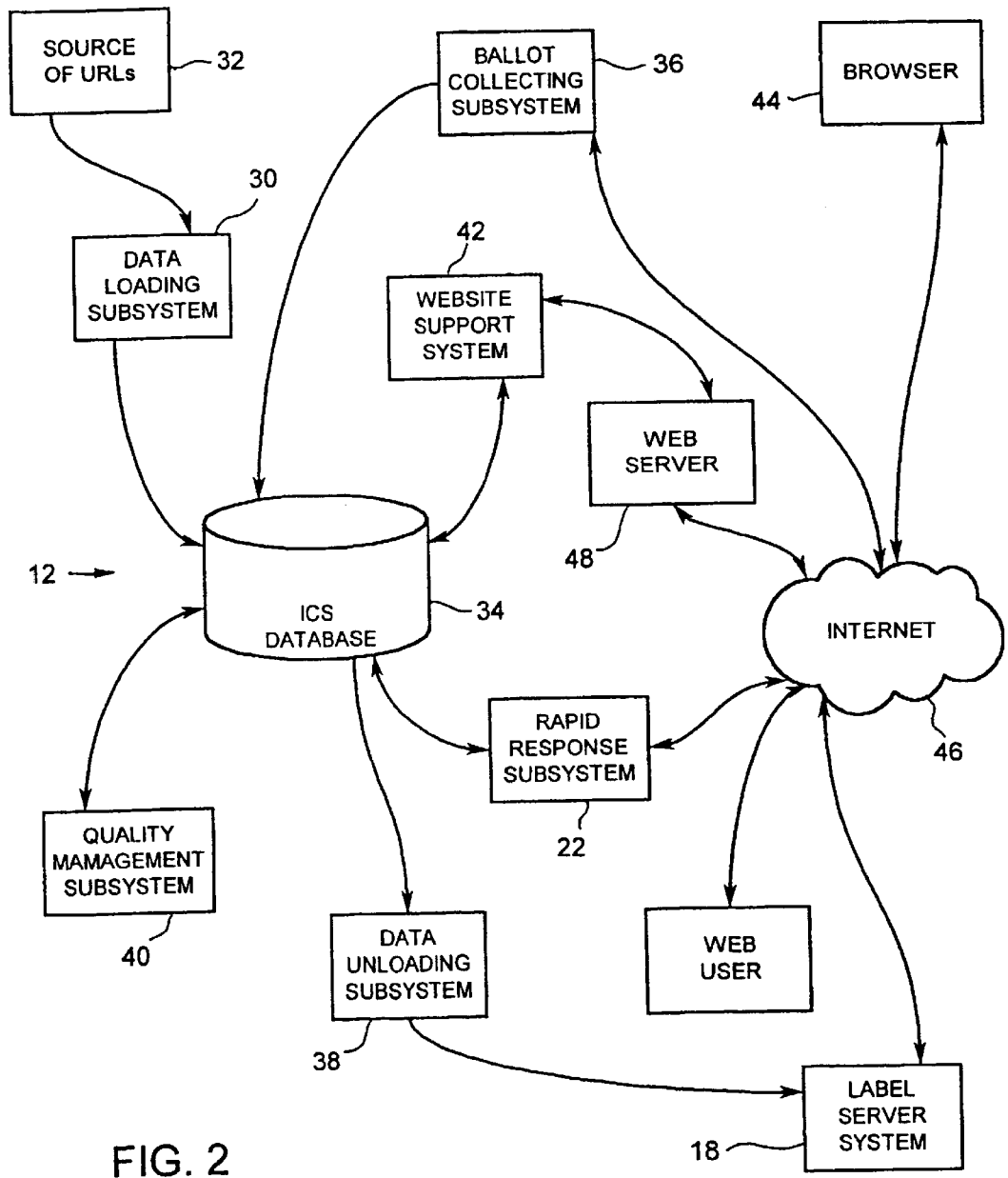
FIG. 2 is a schematic representation of an Internet characterization system forming part of the system of FIG. 1.

FIG. 2 better illustrates the ICS 12. As can be seen, the ICS 12 includes a data loading subsystem (DLS) 30 receiving URLs from many different sources 32 and in many different formats in response to an initiative and translates the URLs into records in a common format. The DLS 30 forwards the formatted URL records to an ICS database 34. The ICS database 34 communicates with a ballot collecting subsystem 36, a data unloading subsystem 38, a quality management subsystem 40, a web support subsystem 42 and the RRS 22.

Ballot collecting subsystem 36 communicates with web browsers 44 installed on members' computers via the Internet 46. The data unloading subsystem 38 communicates with the RLS 18. The quality management subsystem 40 also communicates with the RRS 22 via the Internet 46. The web support subsystem 42 can be accessed by members of the RC 16 as well as by web users via the Internet 46 and web server 48.

Data Loading Subsystem 30

Figure 3:
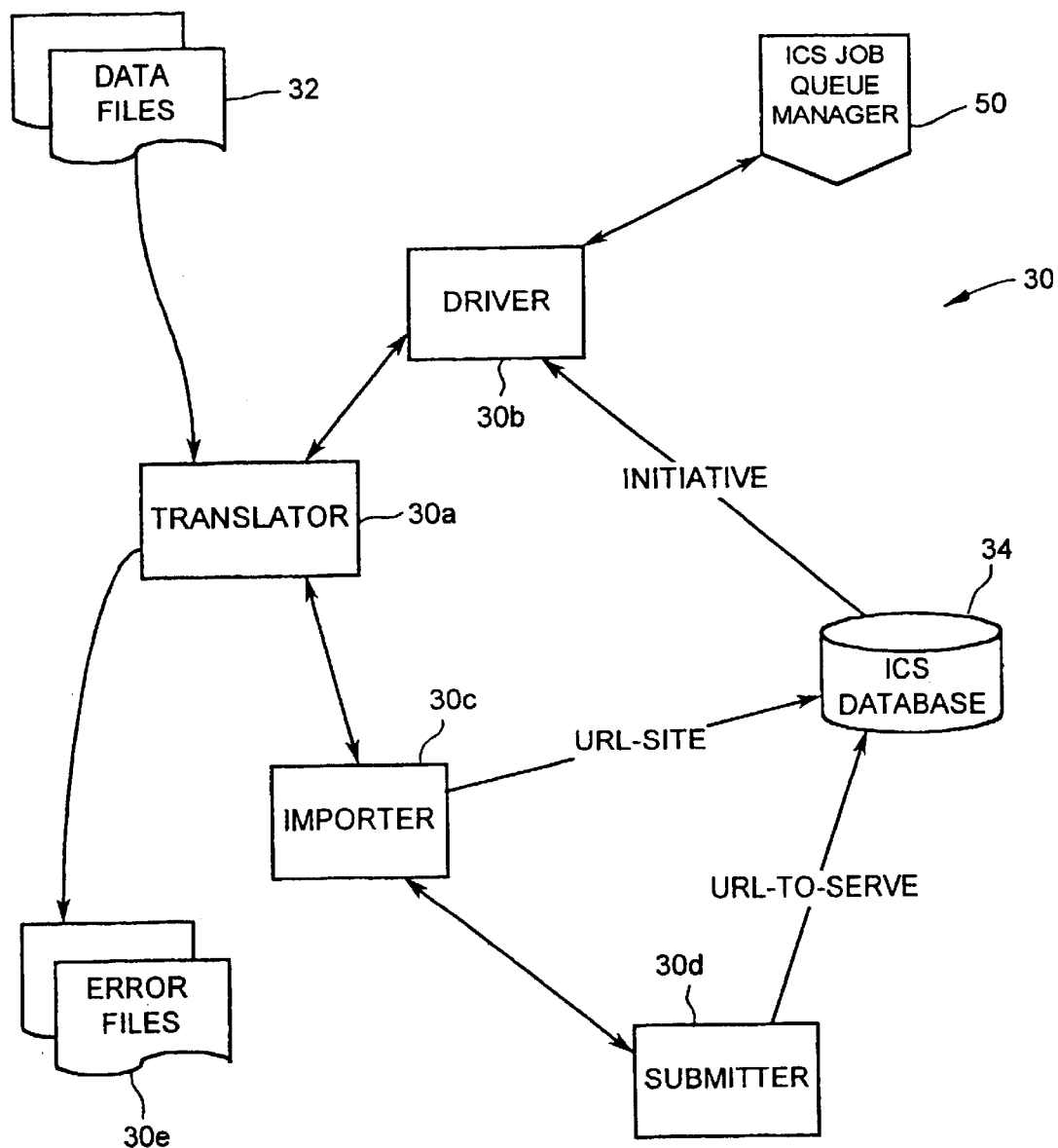
FIG. 3 is a schematic representation of a data loading subsystem forming part of the Internet characterization system of FIG. 2.
Figures 4A, 4B:
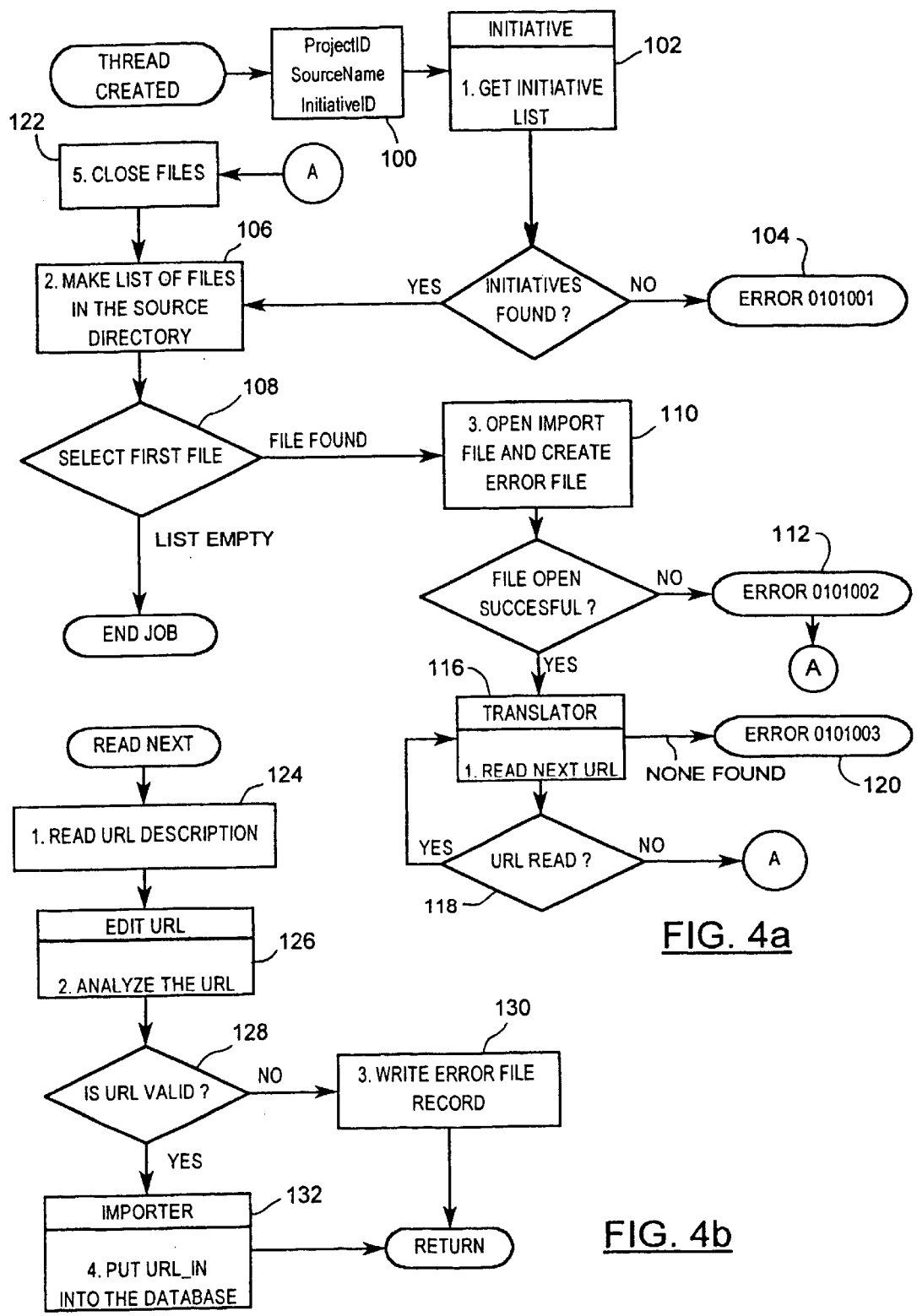

Turning now to FIG. 3, the data loading subsystem 30 is better illustrated and as can be seen, it includes a translator 30a receiving URL data files from the various sources 32. Translator 30a communicates with a driver 30b and an importer 30c. The driver 30b is responsive to initiatives received from the ICS database 34 and communicates with an ICS job queue manager 50. The importer 30c provides URLs and related site data to the ICS database 34 and communicates with a submitter 30d. Submitter 30d provides URLs to be rated by members of the virtual community to the ICS database 34 where they are stored in an URL to serve table. Translator 30a also generates error files 30e.

The driver 30b interacts with the ICS job queue manager 50 and manages the other components of the DLS 30. Referring now to FIGS. 4a to 4d, when one or more initiatives are to be performed, the ICS job queue manager 50 invokes the driver 30b (block 100) which in turn looks to the ICS database 34 for the initiative list holding the initiatives to be serviced (block 102). If no initiatives are found, the driver 30b generates an error flag (block 104). If an initiative list is found, the driver 30b makes a list of the data files that are received from the sources 32 associated with the initiatives to be serviced that are in the initiatives list (block 106). The driver 30b then selects the first file in the list of data files (block 108), opens an import file and creates an error file to store records of error flags (block 110). If the import file cannot be opened, the driver 30b generates an error flag (block 112). If the import file opens, the driver 30b calls the translator 30a.

When the translator 30a is called, the translator reads the URLs from the import file until all of the URLs have been read (blocks 116 and 118). If the translator 30a is unable to read the URLs from the import file an error flag is generated (block 120). As this process is being performed, the driver 30b sends a report to the job queue manager 50 indicating the percentage of the job done. Once all of the URLs in the import file have been read, the import file is closed (block 122). The driver 30b then selects the next file in the initiative list (block 108) and the above steps are repeated until no files remain in the list.

As the translator 30a reads each URL from the import file, the URL is converted into a data format including one tag-value pair per line (block 124). One or more lines constitute a record containing information concerning the URL. The only required tag-value pair is the URL line and is of the form:

---

IN, URL: (complete alphanumeric URL)
   (tag)                  (value)

---

The translator 30a then analyses the URL to ensure it is valid and if site text is included (blocks 126 and 128). If no site text is included, the site text is extracted from the "edit URL object". As is known, the edit URL object is a built in Windows' function that verifies if a string is a valid URL. If the URL is not valid, the translator 30a generates an error record (block 130). If the URL is valid, the translator 30a forwards the URL to the importer 30c (block 132).

As the importer 30c receives the URLs from the translator 30a, the importer corrects common errors and stores the URLs and related site text as records in an URL table in the ICS database 34 (blocks 124 and 136). The importer 30c then passes the IDs of the created URL records to the submitter 30d (block 138). When the submitter receives the URL record IDs, the submitter 30d gets the first initiative from the ICS database 34 (block 140) and reads the URLs and related site data from the IDs. The submitter 30d then puts an URL to serve record for each URL, site and initiative combination in an URL to serve table associated with the initiative that is stored in the ICS database 34 (block 142). This process continues for each initiative for which the URL to serve records are to be recorded (block 144).

Ballot Collecting Subsystem

In general, the ballot collecting subsystem 36 serves URLs to the members participating in initiatives and requests the members to rate the websites associated with the URLs. The members' rating values are collected in the form of ballots. For the most part, URLs are served to members on a priority basis. When a member selects an initiative, the member's initiative rating is compared with the initiative rating assigned to the URL to serve tables. The URL to serve table having the highest priority initiative rating greater than the current initiative being serviced that is within the member's initiative rating is selected. The URLs within the selected URL to serve table that the member has not previously seen during servicing of the initiative are then served to the member in order based on the priority levels assigned to the URLs within the URL to serve table. If there are URLs to serve, some exceptions apply.

Specifically, if an URL served to a member is part of a "guided website tour", the URLs associated with that tour are sent out in order to the member. If a predetermined amount of time has not elapsed since a member previously rated the same URL to be served, the URL is skipped. If the URL is part of a rating community initiative, such as briefing notes or bulletins generated by a community manager of the RC 16, the URL is sent out before any other URLs.

If there are no URL to serve tables assigned a higher priority than the initiative currently being serviced, the current initiative is checked to determine if there are URLs to be served that the member has not previously rated. If so, the URLs are served to the member. If not, a message is sent to the member instructing the member to go to the initiative page of the ICS website and select another initiative.

Figure 5:
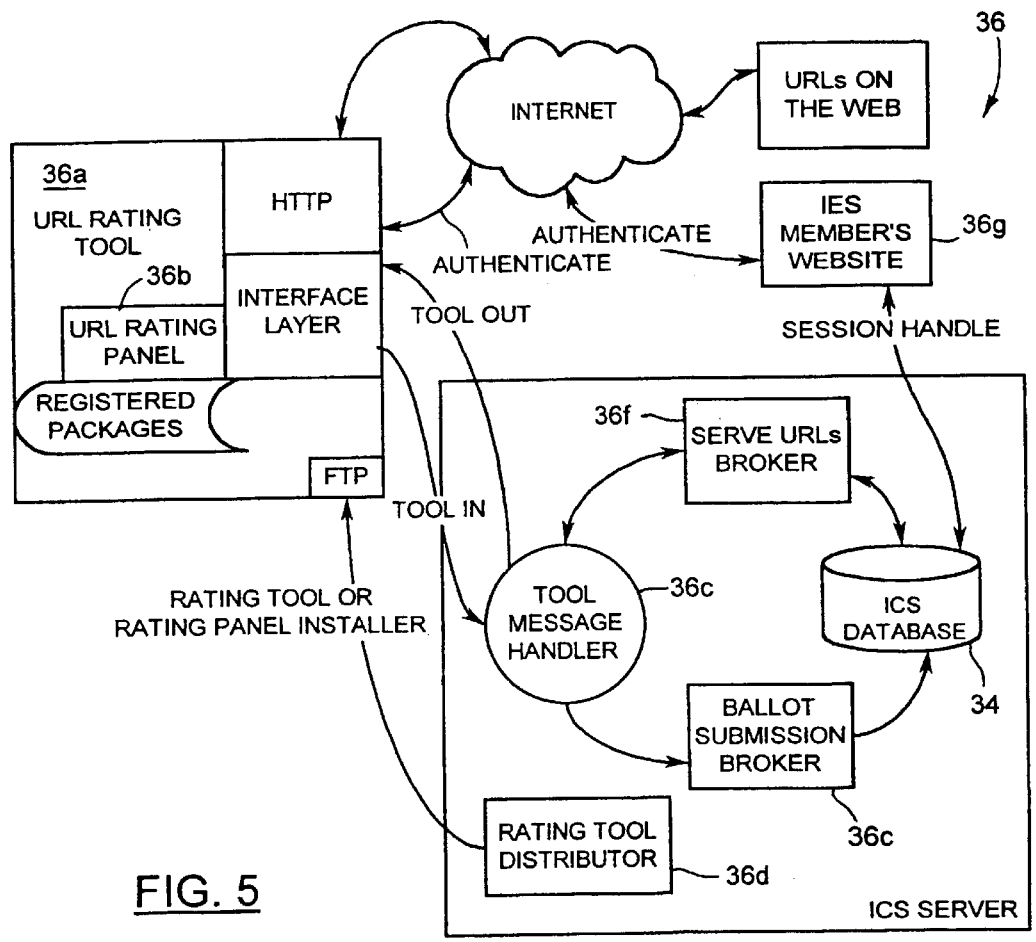
FIG. 5 is a schematic representation of a ballot collecting subsystem forming part of the Internet characterization system of FIG. 2.

FIG. 5 better illustrates the ballot collecting subsystem architecture which is similar to the architecture of the RLS 18. As can be seen, the ballot collecting subsystem 36 includes an URL rating tool (URT) 36a and an URL rating panel 36b that are installed on the computers of qualified members of the virtual community who have opted to participate in the work process and complete initiatives. The URT 36a and URL rating panel 36b constitute browser 44 in FIG. 2 and communicate with a tool message handler (TMH) 36c and a rating tool distributor 36d. TMH 36c communicates with a ballot submission broker 36e and a serve URLs broker 36f. Ballot submission broker 36e and serve URLs broker 36f communicate with the ICS database 34. Serve URLs broker 36f performs the above-identified checks to determine the URLs to serve to the members of the virtual community.

The URT 36a is a full function browser that provides an efficient mechanism for members to visit URLs via the Internet 46 and collect members' opinions about visited website pages or information from other types of work processes. The URT 36a functions as both a browser and a driver for the URL rating panel 36b. Controls on the URT are grouped so that they can be modified and updated via the rating tool distributor 36d through an automatic upgrade process and include browser controls and tab controls. The browser controls operate as a basic Windows application shell.

Turning now to FIG. 6, the URL rating panel 36b is shown. As can be seen, the URL rating panel is a tab set panel that logically groups various URL rating components on individual pages. Each page of the URL rating panel 36b has a help button. The help can either be web-based by taking the user to a particular web page that provides the help text or alternatively, it can be a pop-up window displaying help text. The first and last pages of the URL rating panel 36b are the same regardless of the initiative. The first page contains choices on how to rate the URL with respect to its selection such as for example. Accessed OK, no DNS, Site Not Responding etc. If the member selects anything other than Accessed OK, a Next button is enabled and all other controls on the other pages of the URL rating panel 36b with the exception of the last page are disabled. The Next button allows the member to request another URL to rate.

The last page of the URL rating panel 36b is a button page that lets the member access community tools such as chat rooms, bulletin boards, point reports, etc on the ICS website. These community tools are opened in a separate browser window. In this manner, the member can converse with other qualified members to discuss the initiative and any rating question they may have, check notices posted by other members of the rating community 16 and check their point awards.

When an initiative is to be performed, the initiatives are posted on initiative pages of the ICS website 36g. Qualified members are given access to the initiatives and can opt to participate in the initiatives through the website support subsystem 42. When a qualified member opts to participate in an initiative, a valid session is commenced (see block 160 in FIG. 7a). At this time, the rating tool distributor 36d installs the URT 36a and URL rating panel 36b on the qualified member's computer (block 162). The controls of the URT 36a and URL rating panel 36b are customized to the initiative being performed. Once the URL rating panel 36b has been installed, the serve URLs broker 36f polls the ICS database 34 to locate the URLs to serve table associated with the initiative to be serviced. The first URL to be served in the URL to serve table is then sent to the TMH 36c, which packages the URL in a tool out message. The tool out message is then sent in the form of a rate URL event to the URT 36a for rating by the qualified member using the URL rating panel 36b (block 164).

When the URL rating panel 36b receives the rate URL event, the URL rating panel initializes its controls and invokes a go to URL in the HTTP control of the URT 36a. A visit to the website page associated with the URL is then made allowing the member to rate the website page by filling in the pages of the URL rating panel 36b.

When the member completes the pages of the URL rating panel 36b and invokes a submit ballot event, a return ballot event is generated. The return ballot includes the member's ratings, the member's ID, the URL that was rated and a time stamp. The URT 36a checks the ballot to ensure information has been entered and then packages the ballot in a tool in message. The tool in message is then conveyed to the TMH 36c when the tool in message is unpackaged and checked to ensure it is valid (block 166). If valid, the TMH 36c instructs the serve URLs broker 36f to update the member's point awards (block 168) and checks to see if the submit ballot event includes a request for another URL. If so, the TMH 36c instructs the serve URLs broker 36f to obtain the next URL from the URLs to serve table so that it may be forwarded to the member as described above (block 170). The TMH 36c also delivers the ballot to ballot submission broker 36c (block 172). If the ballot does not include a request for another URL, the session is closed once the ballot is delivered to the ballot submission broker 36e (block 174).

When the serve URLs broker 36f awards points to member's account, the serve URLs broker checks the status of point awards to determine if:

a maximum number of allowable points in a given period of time for the initiative being serviced has been awarded;

the total number of points for the initiative being serviced has been exceeded; and if the maximum number of points a member is permitted to be awarded in a given period of time has been exceeded.

If any of these conditions are detected by the serve URLs broker, the initiative is terminated.

Figure 7A:
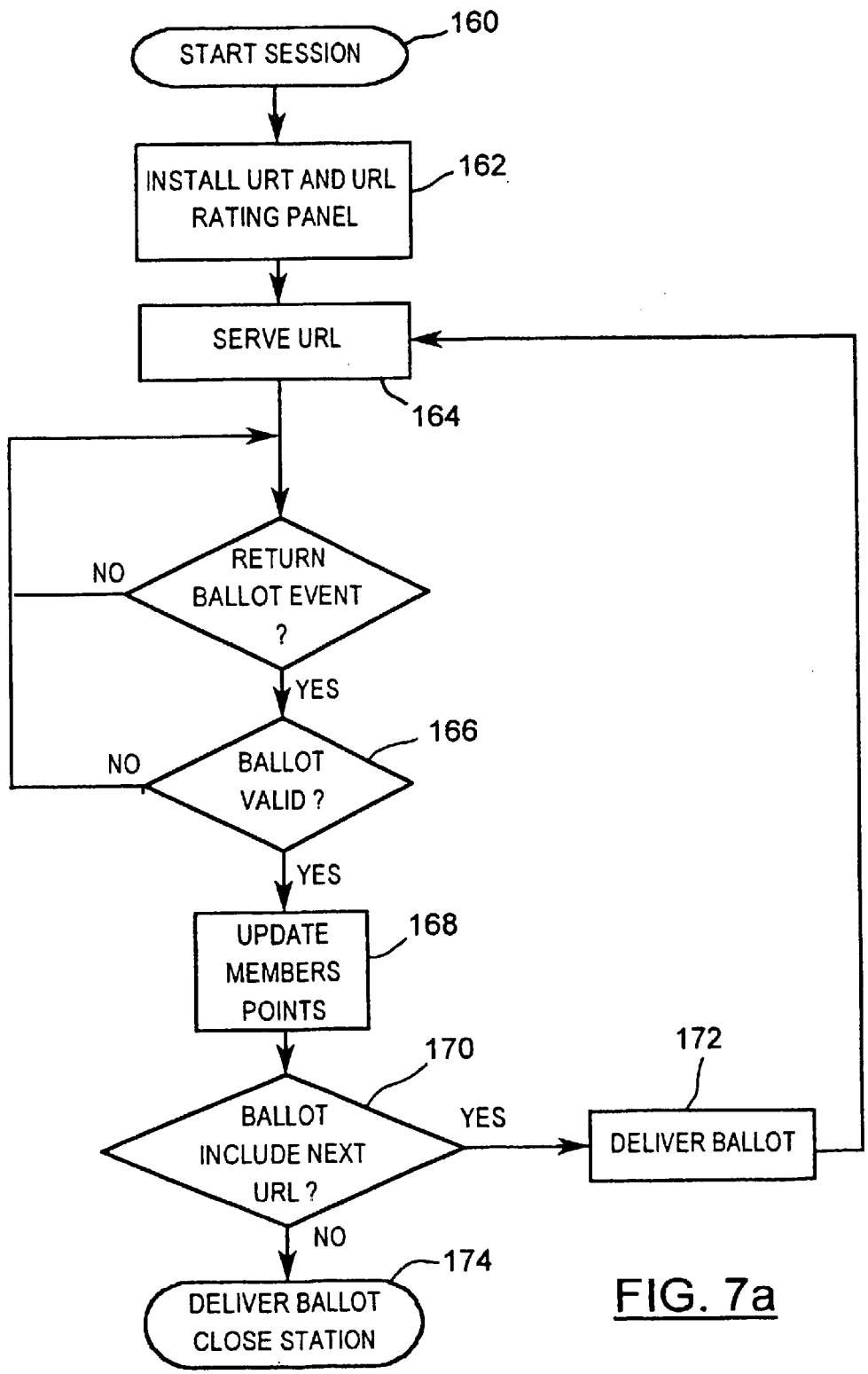
FIGS. 7a and 7b are flowcharts showing steps performed by the ballot collecting subsystem of FIG. 5.
Figure 7B:
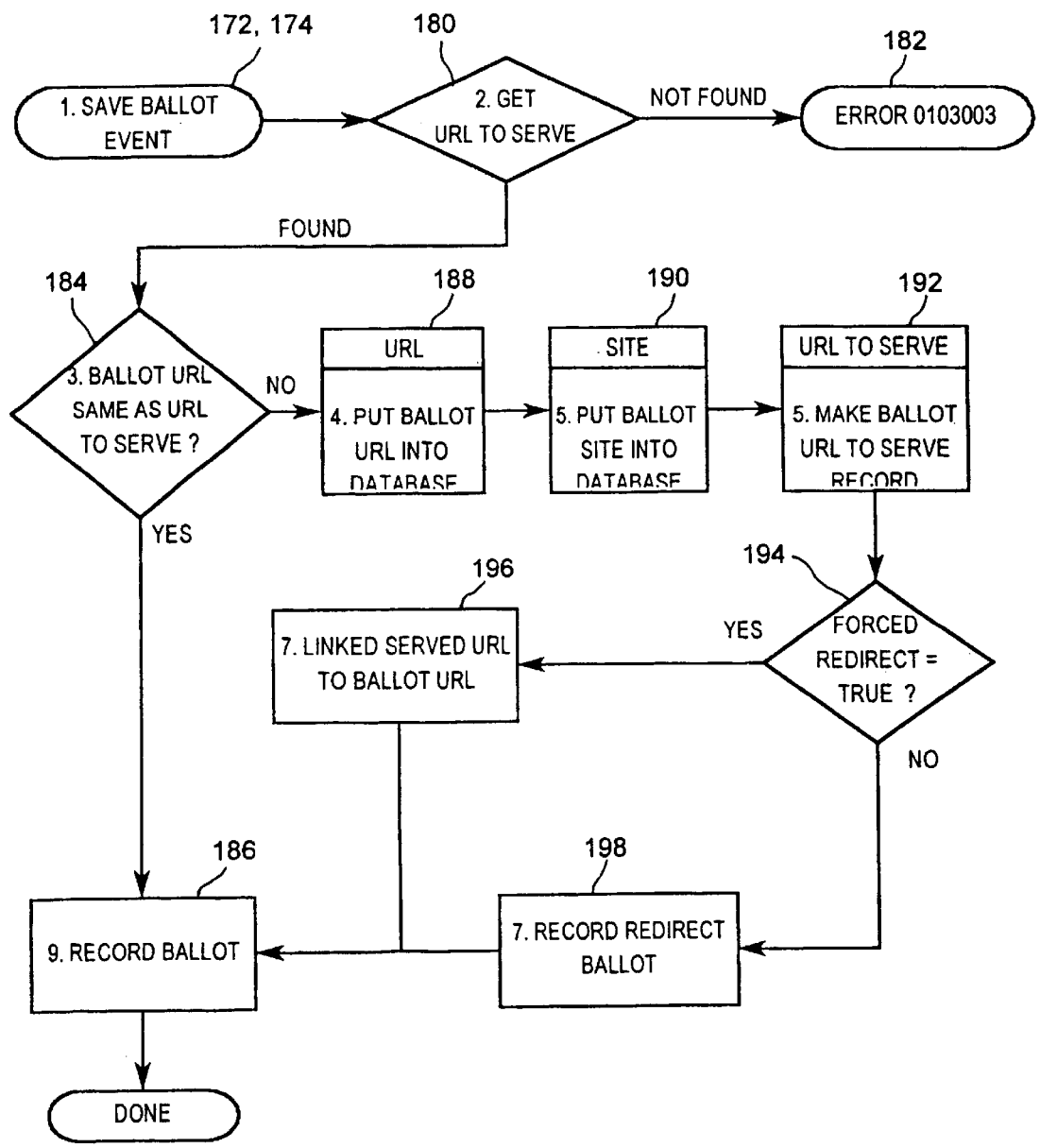

When the ballot submission broker 36e receives a ballot from the TMH 36c, the ballot submission broker 36e checks the ICS database 34 to locate the URL to serve record that was the subject of the original rate URL event (see block 180 in FIG. 7b). If the URL to serve record is not found, an error is generated (block 182). If the URL to serve record is found in the ICS database 34, the ballot submission broker checks to see if the URL text for the ballot and that for the URL are the same (block 814). If they are the same, the ballot is recorded in the ICS database 34 as received (block 186).

If the ballot URL text and the URL text in the URL to serve record are not the same, the ballot submission broker 36e puts the ballot URL and its associated site data into the URL table (blocks 188 and 190). An URL to serve record is then made for the ballot (block 192). A flag is then checked to determine if the member used a hyperlink when rating the URL (block 194). If not, the URL to serve record for the ballot is linked to the served URL (block 196) and the ballot is recorded (block 186). If the member used a hyperlink when rating the URL, a ballot redirect is recorded (block 198) before the ballot is recorded in the ICS database 34.

Data Unloading System

Figure 9:
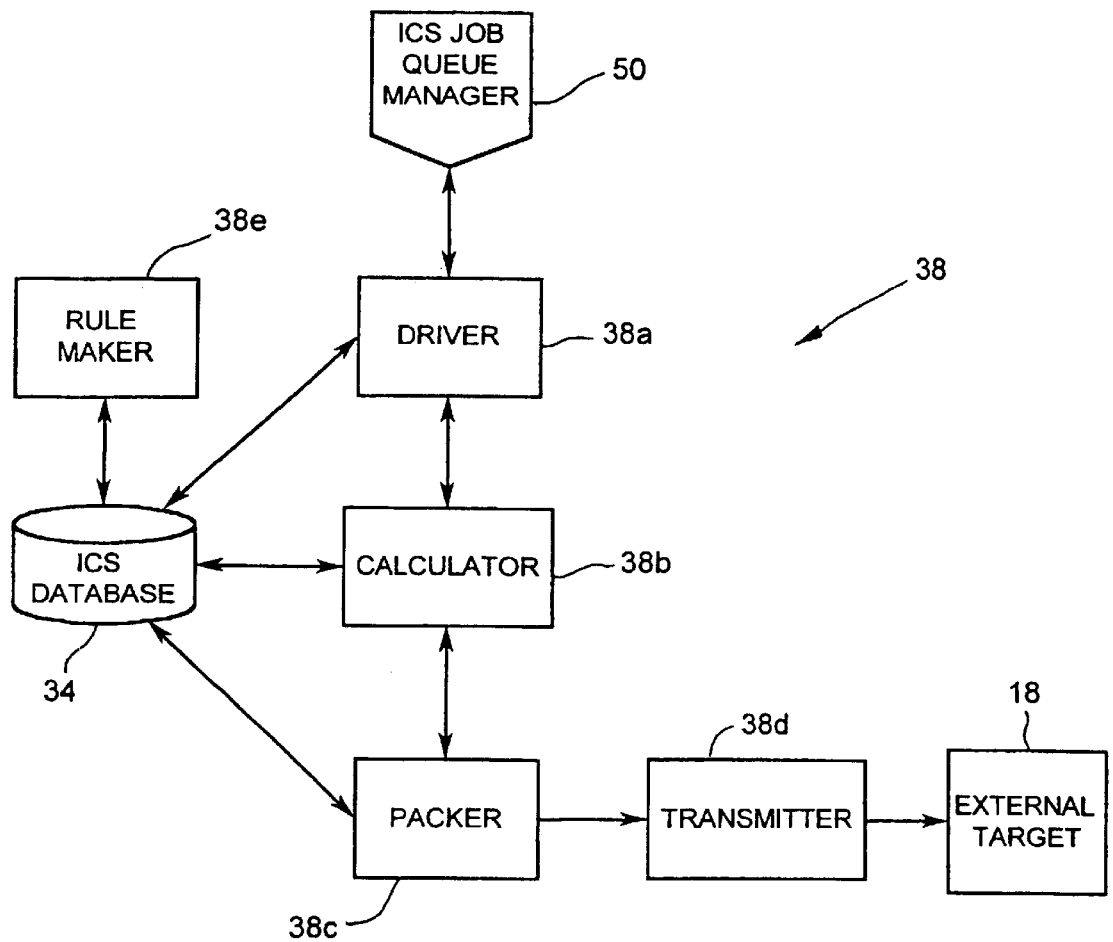
FIG. 9 is a schematic representation of a data unloading subsystem forming part of the Internet characterization system of FIG. 2.

The data unloading subsystem 38 includes a collection of processes that translate parts of the ICS database 34 into desired output formats. Each process is executed as a separate job under the control of the ICS job queue manager 50. Turning now to FIG. 9, the data unloading subsystem 38 is better illustrated and includes a driver 38a communicating with the ICS database 34, the ICS job queue manager 50 and a calculator 38b. The calculator 38b also communicates with a packer 38c which in turn communicates with the ICS database 34. The packer 38c provides output to a transmitter 38d which in turn outputs data to the RLS 18. A rule maker 38e also communicates with the ICS database 34.

The calculator 38b translates ballots into URL attributes if required and invokes one or more rating processes in accordance with rules in the ICS database 34 established via the rule maker 38e. In the present embodiment, the calculator regularly tabulates ballots stored in the ICS database 34 to calculate URL ratings based on the values assigned by members to ballot attributes. Specifically, ballots in the ICS database are scanned to determine URLs that have received new valid ballots since their last rating. The new valid ballots are used to calculate ratings for the URLs. The rating for each URL is calculated using one of a number of methods depending on the initiative and work process. In the present embodiment, the rating methods available to calculate the URL ratings include a "first pass the post" rating method, a "percent to vote" rating method and a "weighted average" rating method. Regardless of the rating method used, a number of rules listed below are generally followed:

most URLs do not change ratings;
  the majority of URLs at a site of type X will have a rating of type X, especially adult sites (i.e. trusted sites);
  if an URL is of type X the pages below it are probably type X as well;
  a single URL or site can have different ratings depending on the audience;
  trusted members rating the URL have more influence than unknown raters;
  experienced members rating the URLs are more trusted than novice raters;
  trained members rating the URLs are more trusted than untrained raters;
  newer ballots have more weight than older ballots;
  more ballots relating to a single URL produce more reliable ratings;
  classifying non-adult sites as adult sites is preferable to the converse;
  qualitative ratings such as "quality" require guidelines to be consistent; and
  extraordinary ratings require extraordinary evidence.

In the "first pass the post" rating method, ballots for the URL to be rated that were generated by different members of the virtual community, are examined to determine the number of times member rating values for the ballot attribute(s) being used to rate the URL occur. The ballot attribute value with the most number of votes becomes the rating value for the URL. In the case of a tie, the URL is served back to the virtual community a preset number of times in order to receive more URL rating ballots. The rating method is continued using the new ballots until a ballot attribute value is shown to have a majority. If no majority can be found, the URL is flagged and is sent to an audit committee for review. The audit committee in turn reviews the URL to decide how the URL is to be rated. The audio committee's decision takes into account the existing ballots and makes a final URL rating decision. FIG. 8a shows an example of "first pass the post" URL rating. Once a rating value for a ballot attribute has been determined, that ballot attribute is migrated so that no further rating steps are performed for that ballot attribute. Although the "first to pass the post" rating method allows ratings to be assigned to URLs, this method can be somewhat problematic. This is due to the fact that it is possible to over or under rate an URL if the vote is close, since a single ballot can alter the URL rating.

In the "percent to vote" method, the number of times member rating values for each ballot attribute occur is determined. In order for one of the member rating values to be selected as the URL rating, that member rating value must attain at least a threshold percentage of the total ballot vote. If no URL rating can be selected, the URL is served back to the virtual community a preset number of times in order to receive more URL rating ballots. The rating method is continued using the new ballots until a ballot attribute value meets the threshold percentage. If no URL rating can be found, the URL is flagged and is sent to an audit committee for review. The audit committee in turn reviews the URL to decide how the URL is to be rated. The audit committee's decision takes into account the existing ballots and makes a final URL rating decision. FIG. 8b shows an example of "percent to vote" URL rating. Once a rating value for a ballot attribute has been determined, that ballot attribute is migrated so that no further rating steps are performed for that ballot attribute.

The "weighted average" rating method considers only ballot attributes that receives votes. In this method, a weighted average of the ballot results is calculated and the result is rounded up or down using normal rounding rules; that is, if the decimal portion is less than or equal to 0.5, the result is rounded down and otherwise the result is rounded up. The values for the ballot attributes are carefully chosen so that the spectrum of values goes from less to more restrictive in the case of maturity level rating higher or lower to higher for quality rating. A ballot attribute having a clear majority of the votes is selected as the URL rating. If no URL rating can be selected, the URL is served back to the virtual community a preset number of times in order to receive more URL rating ballots. The rating method is continued using the new ballots until a ballot attribute value is shown having a clear majority. If no URL rating can be found, the URL is flagged and is sent to an audit committee for review. The audit committee in turn reviews the URL to decide how the URL is to be rated. The audio committee's decision taken into account the existing ballots and makes a final URL rating decision. FIG. 8c shows an example of "weighted average" URL rating.

During the URL rating process, as ratings are assigned to URLs within directories, if a predetermined percentage, in this case 10%, of the URLs in the directory are being assigned the same rating, then the rating process for the URLs in the directory is stopped and the URL representing the directory is assigned a generic rating that is the same as the ratings assigned to the URLs within the directory. At any time, if one of the URLs in the directory is given a rating that differs from the generic rating assigned to the directory URL, the generic rating is automatically removed. If desired, based on the ratings assigned to the URLs, overall ratings for websites can be generated.

After the calculator 38b has generated the URL ratings, the URL ratings are sent to the packer where they are packed as labels prior to being transmitted by the transmitter to the RLS 18.

Ratings Label Server System

Figure 10:
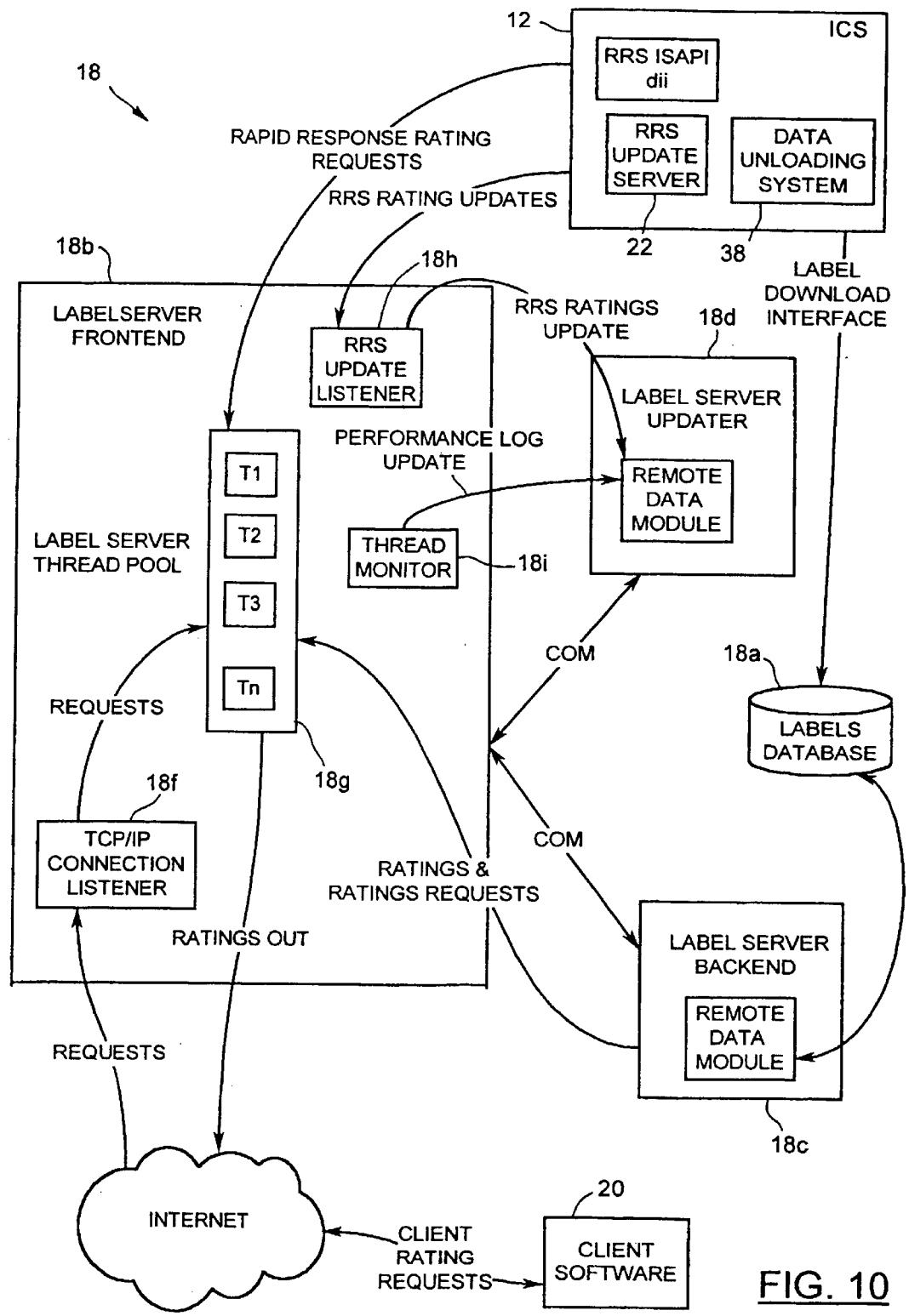
FIG. 10 is a schematic representation of a rating label server system forming part of the system of FIG. 1.
Figure 11:
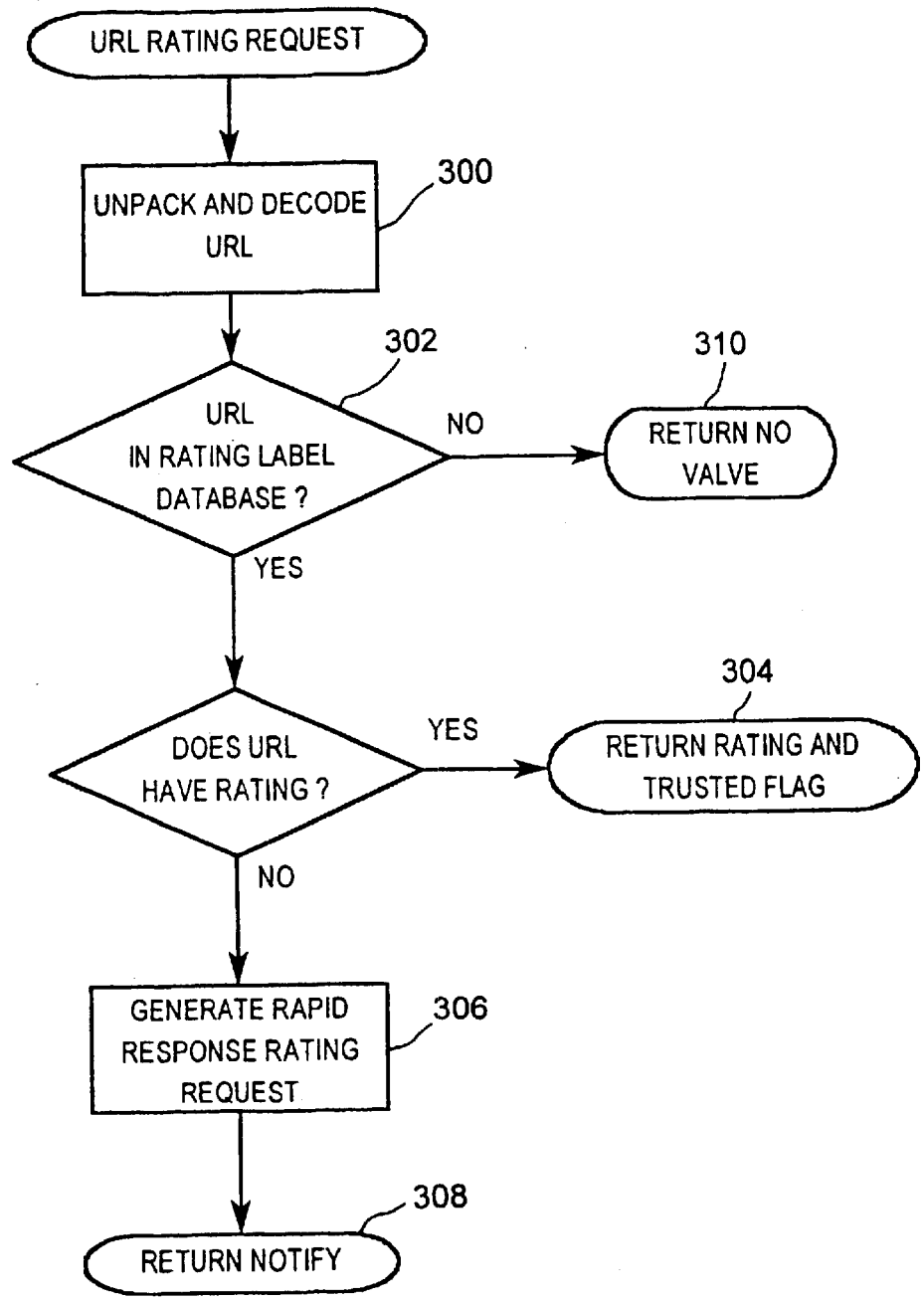
FIG. 11 is a flowchart showing steps performed by the rating label server system of FIG. 10.

Turning now to FIG. 10, the ratings label server system 18 is better illustrated. The ratings label server system architecture allows the data access processes to be separated from the communication processes. The ratings label server system 18 includes a rating label database 18a and a rating label server constituted by three subsystems, namely a rating label server frontend 18b, a rating label server backend 18c and a rating label server updater 18d. The rating label server frontend 18b manages communications with client software 29. The rating label server backend 18c manages communications with the rating label database 18a. The rating label server updater 18d keeps the rating label database 18a in step with the ICS database 34. The rating label database 18a stores a list of URLs, rating assigned to the URLs and trusted flag values assigned to the URLs.

As can be seen, the rating label server frontend 18b includes a TCP/IP connection listener 18f, a thread pool 18g, a thread monitor 18i and an RS update listener 18h. The TCP/IP connection listener 18f listens on a specified port for rating label requests via either UDP or PICS HTTP protocol from client software 20 over an Internet connection. When the TCP/IP connection listener 18f receives an URL rating label request, the TCP/IP connection listener 18f passes the socket connection and the input datastream to the first available thread in the thread pool 18g. The thread unpacks the input datastream to decode the URL for which a rating label is requested and generates an URL rating request that is conveyed to the rating label server backend 18c (see block 300 in FIG. 11).

When the label rating server backend 18c receives the URL rating request, the label rating server backend searches the rating label database 18a for the URL (block 302). If the URL is in the rating label database 18a and the URL has an assigned rating label, the rating label server backend 18c returns the URL rating and the value of its associated trusted flag to the thread pool 18g. An available thread in the thread pool in turn packages the URL rating and the trusted flag into an output datastream and conveys the output datastream to the client software 20 (block 304). If the URL is in the rating label database 18a but no assigned URL rating exists, the rating label server backend 18c notifies the thread pool 18g. An available thread in turn generates a rapid response rating request and conveys the rapid response rating request to the ICS 12 (block 306). The thread also sends a notice to the client software 20 (block 308). If the URL is not in the rating label database 18a, the rating label server backend 18c returns a no rating value to the thread pool 18g. An available thread in the thread pool in turn packages the no rating value into an output datastream and conveys the output datastream to the client software 20 (block 310).

The RRS update listener 18h monitors the RRS 22 to detect rapid response labels generated for URLs whose ratings have been re-accessed and provides RRS rating label updates to the rating label updater 18d. The rating label updater 18d in turn updates the URL ratings in the rating label database 18a.

The thread monitor 18i monitors the performance of the rating label server recording the times rating label requests are received and the times the requests are completed in a performance log. The thread monitor 18h also records the RRS updates and RRS requests as well as thread usage. If thread usage exceeds a predetermined percentage of the thread pool resources for a specified period of time, the thread pool is increased and the performance is recorded in the performance log.

Rapid Response System

The RRS 22 allows URL rating errors to be quickly corrected by requesting the ICS 12 to submit URLs with questionable ratings to the RC 16 for re-assessment by members of virtual communities. URLs for which ratings are to be re-assessed may be submitted to the RRS via e-mail or via a web-based submission form. When the ICS 12 receives a request from the RRS to re-assess an URL, the URL is given a high priority and is served back to the virtual community for immediate assessment by a number of members.

Figure 12:
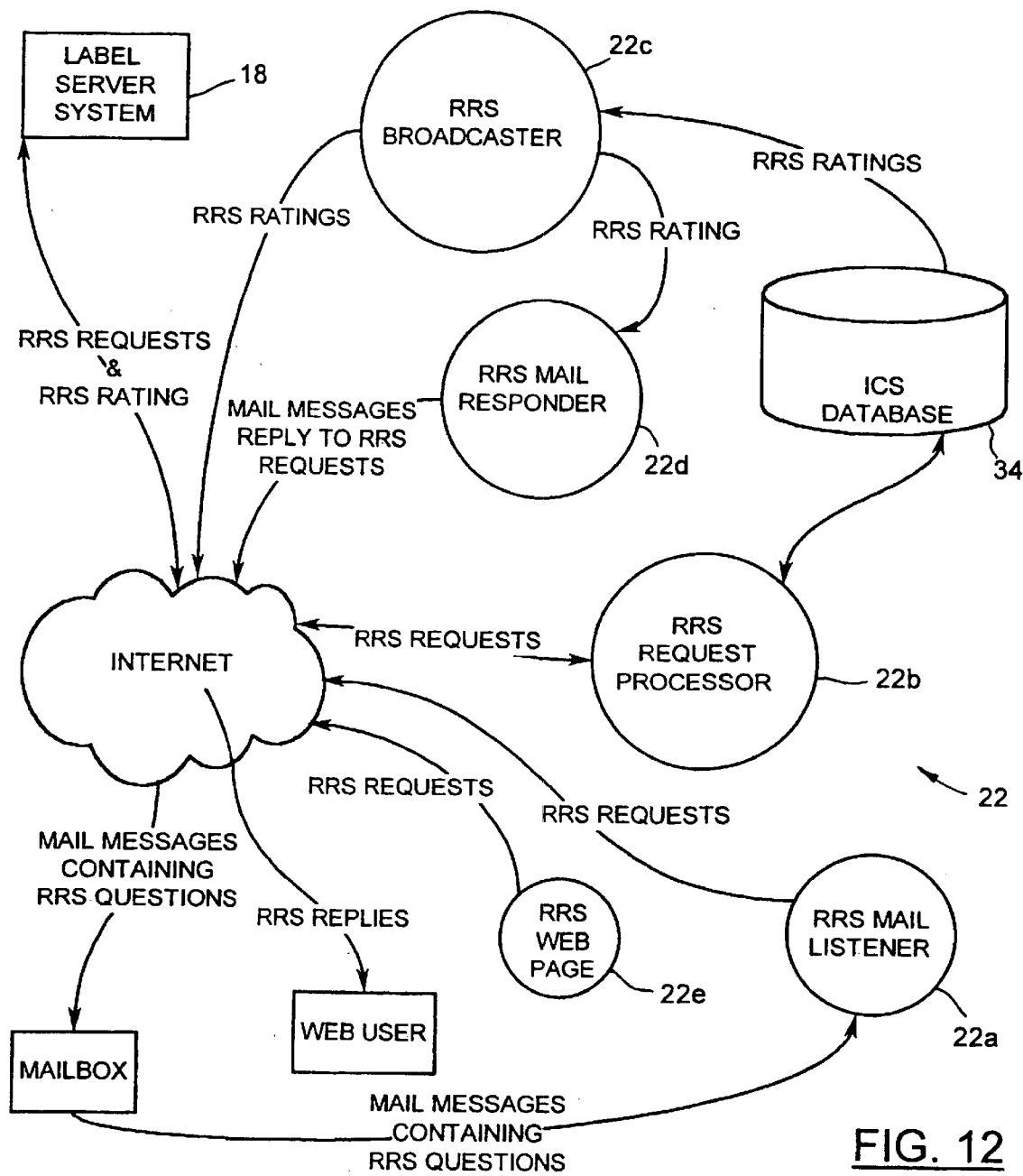
FIG. 12 is a schematic representation of a rapid response system forming part of the system of FIG. 1.

Turning now to FIG. 12, the RRS 22 is better illustrated and as can be seen, in includes an RRS mail listener 22a to receive e-mail based rapid response label requests. An RRS request processor 22b communicates with the RRS mail listener, an RRS web page 22e, the RLS 18 and the ICS database 34. An RRS broadcaster 22c also communicates with the ICS database 34 and with an RRS mail responder 22d.

When the RRS processor 22b receives RRS requests either from the RRS mail listener 22a, the RRS web page 22e or the RLS 18, the RRS request processor 22b, examines the RRS request to ensure it has a valid URL string. If the URL is invalid, an error is flagged. If the requester is the RLS 18, then an invalid label is returned. If the requester is a web user and wants a reply, then an invalid URL label email is sent to the requester via the RRS mail responder 22d.

If the URL is valid and the requester is a web user who wants a reply, then an email stating that a rating is in progress is sent to the requester via the RRS mail responder. The RRS request processor then gets an RRS initiative for the URL and creates an URL to serve record for the URL in the ICS database 34. The RRS initiative is assigned a high priority initiative so that the URL to serve record is served to a number of members of the virtual community for rating quickly. The RRS broadcaster 22 detects when a new URL label for the URL has been made as a result of the new member ballots and provides the new URL label to either the e-mail or web requester as well as to the RLS 18.

Quality Management Subsystem

Figure 13:
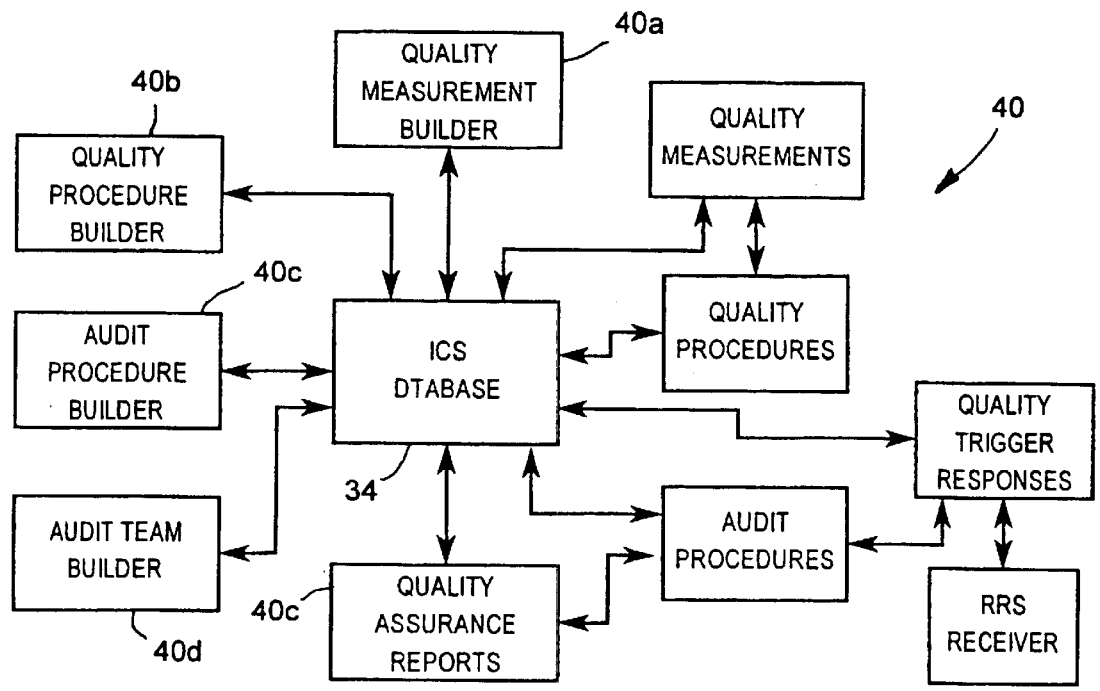
FIG. 13 is a schematic representation of a quality management subsystem forming part of the Internet characterization system of FIG. 2.
Figure 14:
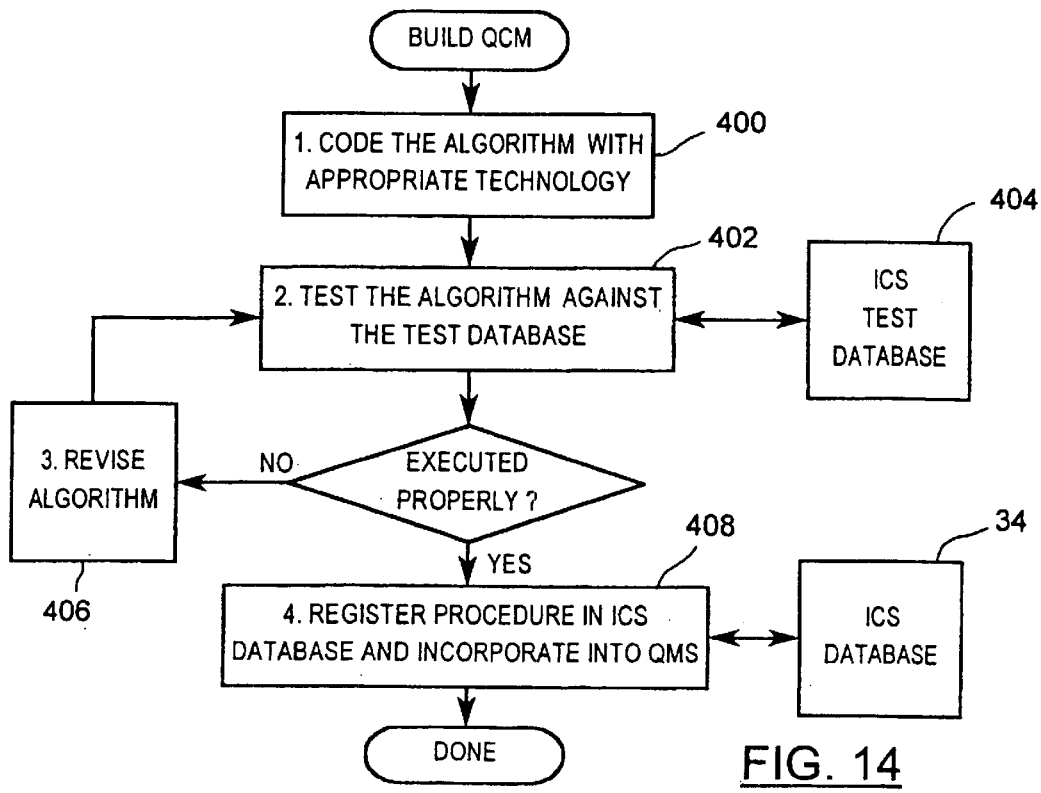
FIG. 14 is a flowchart showing steps performed by the quality management subsystem of FIG. 13.

The quality management subsystem (QMS) 40 includes a set of interactive modules to ensure Internet content ratings submitted by members of the virtual community are of high quality. The QMS is an integral part of the ICS 12 rather than just an add-on process. Turning now to FIG. 13, the QMS 40 is better illustrated. As can be seen, the QMS includes a quality measurement builder 40a, a quality procedure builder 40b, an audit procedure builder 40c, an audit team builder 40d and a quality assurance reporter 40e, each of which communicates with ICS database 34.

The quality measurement builder 40a allows a system administrator to make, test and register a quality measurement with the QMS. The quality measurement builder is invoked when a request for a new type of measurement is made by the system administrator. The quality measurement builder is implemented as a human process so that when a request for a new type of measurement is received from the system administrator, a suitable algorithm is developed and implemented so that the measurement can be made (see FIG. 14). Specifically, when a request for a new type of measurement is received by the quality measurement builder, an algorithm is developed (block 400) which will operate directly on the ICS database to measure the desired data. The algorithm is then tested against a test ICS database (blocks 402 and 404). If the algorithm does not execute properly, the algorithm is revised and re-tested (block 406). If the algorithm executes properly, the algorithm is registered in the ICS database and incorporated into the QMS 40 (block 408).

The quality procedure builder 40b allows a community manager to create, delete or modify a quality procedure. The quality procedure builder is in the form of an application or object that can be invoked by the community manager to allow the community manager to view a list of all of the quality procedures, create quality procedures, copy quality procedures, edit quality procedures, submit quality procedure to place them in a queue for implementation in an audit procedure and to delete quality procedures.

The audit procedure builder 40c allows an authorized member of the virtual community to create, delete or modify an audit procedure. The audit procedure builder is also in the form of an application or object that can be invoked by the authorized member to allow the authorized member to view the audit procedure list, create audit procedures, copy audit procedures, edit audit procedures, submit audit procedures to the queue and delete audit procedures.

The audit team builder 40d allows authorized members to select members of the virtual community and assign them to an audit team. The audit team builder is also in the form of an application or object that can be invoked by the authorized member to allow the authorized member to view the audit team list, create an audit team, copy an audit team, edit an audit team and delete an audit team.

The quality assurance reporter 40e generates reports in response to audit procedures and provides the reports to the system administrator, community manager and audit team members.

Quality Control Procedures

In the present embodiment, the QMS includes a plurality of quality procedures designed to monitor the performance of members of the virtual community during rating of Internet content. When a potential quality issue is detected by one or more of the quality procedures, a quality trigger is generated. In response to the quality trigger, steps can be taken to verify and rectify the quality issue. The quality procedures can run continuously or be invoked at discrete times. Specifically, the QMS includes a rating speed quality procedure for measuring the time difference between the time an URL is requested by a member and the time the ballot for that URL is submitted by the member. The rating speed quality procedure is typically invoked by an audit team manager or community manager when there is a suspicion that a member is rating URLs too quickly to produce proper ratings as well as during random quality audits.

The QMS also includes an anti-spamming quality procedure, which is similar to the rating speed monitor. The anti-spamming quality procedure compares the speed URLs are rated by a member against a standard and also looks for steady-state rating intervals and long stretches of non-stop URL rating by a member. The anti-spamming quality procedure is required because members are often tempted to maximize point returns by creating macro-driven routines that continuously click on the URL request button of the URL rating panel 36b. The anti-spamming quality procedure is typically invoked by an audit team manager or community manager when a member is suspected of spamming as well as during random quality audits.

The QMS also includes a compared characterization average quality procedure that compares a member's work for a particular initiative with a base set of other members' work for the same initiative excluding that member's work. During execution of this quality procedure, a histogram of a member's response for each ballot attribute is built together with a histogram of the base set for the same set of ballot attributes. The histograms are normalized and compared to determine if the member's rating values are out of tolerance. The compared characterization average quality procedure is normally invoked by an audit team manager or community manger when there is a suspicion that a member is behaving out of tolerance.

For some projects, members have the option of not submitting any rating information concerning an URL. This is permitted since some URLs may be difficult for members to review as a result of content, some URLs may simply be blank pages, and in some cases, servers may not respond. On occasion, members may try to tack advantage of this and click through large volumes of material in an attempt to find interesting websites or webpages. To determine a member acting in this member, the QMS includes a quality procedure that evaluates the URLs requested by a member and the ratings submitted by the member to determine if the ratio exceeds a certain value. Again, this quality procedure is typically invoked by an audit team manager or community team manager when there is a suspicion that a member is behaving out of tolerance as well as during random quality audits.

In some cases, URLs will have been assigned more than one ballot. This can be the result of the same URL being reviewed for different projects or if a member rating one URL is redirected to another URL. This can also happen if a member submits a ballot for an URL that they were not asked to review. Having multiple ballots for URLs resulting from different projects having similar philosophies is an opportunity to cross-check work by comparing the values assigned to the same ballot attributes. To utilize this data, the QMS 40 includes a diametrically opposed ballot quality procedure that can be invoked to find URLs with ballot attribute values that are diametrically opposed, such as for example, when one member rates the URL as an adult site and another member rates the URL as a general site. Significant differences in the attribute ratings may be an indication of a quality problem with one of the members. Ideally, this quality procedure is invoked during random quality audits or as part of an audit procedure being conducted on a specific member.

The QMS also includes an excessive number of invoked quality triggers quality procedure to monitor the number and type of quality triggers generated in response to a members submissions to determine if a preset value is exceeded. In this manner, members with chronic quality problems or members trying to "hijack" the system repeatedly for their own purposes can be detected.

The QMS also includes a bias determination quality procedure for identifying members who may be biased. This is important to ensure that ratings represent a balanced community view. The bias determination quality procedure is typically invoked when there is a suspicion that a member is biased as well as during random quality audits. During this quality procedure, a minimum number of ballots sufficient to ensure statistical significance are selected at random from a work process relating to the ballot attribute for which a bias determination is to be made, excluding ballots submitted by the member under observation. The results of this selection yield a project histogram. The corresponding ballots rendered by the member are also selected to yield a member histogram. The correlation coefficient $r_{jk}$ between the project histogram and the member histogram is then computed using the following equation:

$$r_{jk} = \frac{\text{cov}_{jk}}{\sigma_j \sigma_k}$$

where:

$$\text{cov}_{jk} = \frac{\left(\sum_{i=1}^{n} X_{ij} X_{ik} - \frac{\sum_{i=1}^{n} X_{ij} \sum_{i=1}^{n} X_{ik}}{n}\right)}{(n-1)}$$

and $$\sigma = \sqrt{\frac{\left(\sum_{i=1}^{n} X_i^2 - \frac{\left(\sum_{i=1}^{n} X_i\right)^2}{n}\right)}{n-1}}$$

and where j refers to the project histogram values and k refers the member histogram values.

| $r_{jk}$ | Interpretation |
| --- | --- |
| UNDEF | a) If $\sigma_j$ is 0 then there is no variability in the project's values.<br>b) If $\sigma_k$ is 0 then there is variability in the member's values. This may indicate that either of the sample sets, by chance, have no variability, or, that there is a problem with how the initiative is being rated or how the member is rating. In the latter, it may indicate a spamming problem. |
| Between −.5 And .5 | No correlation at all between the member's and project's values. The closer to zero this number is, the greater the lack of correlation. This may indicate a spamming problem or a member not taking enough time to analyze the URLs and just selecting values at random. |
| <−.5 | The member's values are tending towards being opposite of those of the project. The closer to −1 the value is, the more it diverges from those of the project. |
| >.5 | The member's values are tending towards those of the project. The closer to 1 the value is, the more it matches those of the project. |
| Close to 1 | The member's values are in sync with those of the project. |

-continued

| $r_{jk}$ | Interpretation |
| --- | --- |
| Close to −1 | The member's values are completely opposite to those of the project. |

Referring now to Appendix 1, an example of correlation co-efficient calculation where 30 URLs have been selected at random from a project where religious content of website is being rated and are compared against values provided by a member in question. In case one, it can be seen that there is perfect aggreement between the member and the project base set. In case two, the negative correlation co-efficient may indicate a potential bias against religious sites. In case three, the low values for the correlation co-efficient indicate no correlation at all. Yet by inspection, it appears that there may be bias against religious sites. In case four, the member has rated no sites as religious. This may indicate spamming behavior or a bias against religious sites by refusing to rate them at all. In case five, the correlation co-efficient tends to indicate a fair degree of match but from inspection, it is clear that the member may have a bias against religious sites.

As will be appreciated, the correlation co-efficient on its own cannot be taken as a hard and fast indicator of bias. However, it does provide an indication that a potential bias may exist and acts as an indicator of other problems. As a result, the correlation coefficient must be viewed in the context of the actual categorization values being rated.

To determine that bias actually exists, positive skew factor, negative skew factor and NSF Delta indicators are also used. The positive skew factor is determined by computing the percentage of ballots that fall above the average bias determinator. The negative skew factor is determined by computing the percentage of ballots that fall below the average bias determinator. The NSF Delta is determined by calculating the percentage of ballots for the project that fall below the average bias determinator, subtracting the percentage from the negative skew factor and taking the absolute value of the result. Using these three indicators, the following rule can be applied:

"If the Correlation is Negative AND (PSF is High OR NSF is High) AND (ABS (NSF (MBR)—NSF (PROJ))) is High then the possibility of Bias is increased".

To implement this rule, a fuzzy logic technique is used to deal with boundary conditions in a gradual manner rather than an all or nothing approach. The technique uses approximate reasoning to determine the degree of membership in a set and supports normal boolean logic. In particular, straight linear modeling is applied to model elements of the rule. The linear models and equivalent algebraic expressions as well as examples of the linear models being applied to render a bias determination calculation are shown in Appendix 2.

The QMS 40 also includes a machine characterizations/member characterization mismatch quality procedure. This quality procedure monitors a member's work to detect if a submitted URL rating deviates from a machine characterization for the same URL by a certain value by comparing selected ballots with equivalent machine categorization values. An attribute selection list defines which attributes are compared, how they map to machine categorization values and how the ballot attribute values map to the machine categorization values.

The expected/received characterization mismatch quality procedure is similar to the machine categorization/member categorization mismatch quality procedure and is designed to compare a rating assigned to an URL by the ICS 12 with ratings provided by other services.

The mismatch characterization on a trusted site quality procedure evaluates specific ratings of URL's prefixed with a treated URL so that if the specific URL rates is different from the trusted generic rating, then the URL can be recycled to the virtual community and additional opinions solicited. This quality control procedure is invoked when there is a suspicion that a member is biased as well as during random quality audits.

The mismatch characterizations on links embedded in the URL quality procedure compares ratings of URLs that are linked to other URLs to allow questionable ratings to be identified. During this quality procedure, the URL's HTML source is obtained and the HTTP links are parsed out and examined to see if a ballot or rating exists for the link. If the embedded URL does not exist in the ICS database 34, then an RRS request is generated for the embedded URL. If a rating or ballot for the URL exists in the ICS database 34 and it is different from the page that it is embedded in, an RRS request for the embedded URL and the URL that it was embedded in is generated. The return labels are then examined to determine discrepancies in ratings. This quality procedure is typically invoked when there is a suspicion that a member is biased as well as during random quality audits.

When a quality procedure detects a member quality issue, a quality trigger is generated to notify the system administrator and community manager. The community manager can then set up an audit team comprised of members of the virtual community to review the member's work and determine if a problem exists. Depending on the severity of the quality issue, the member may be asked to re-train or may be stripped of membership privileges. Member quality issues are stored in the members' profiles and can be used to make qualification decisions.

Website Support Subsystem

Figure 15:
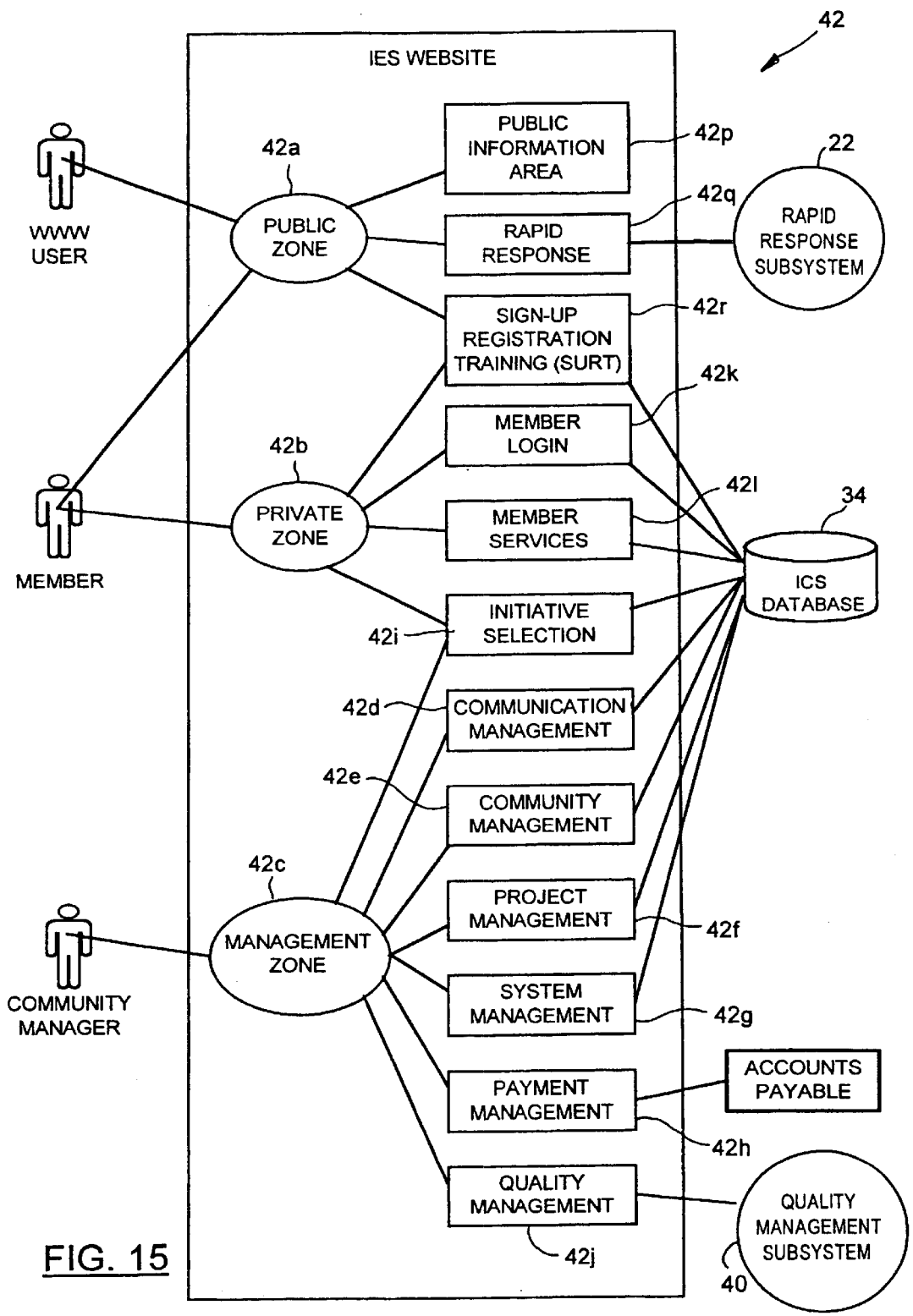
FIG. 15 is a schematic representation of a website support subsystem forming part of the Internet characterization system of FIG. 2.

FIG. 15 better illustrates the website support subsystem 42. The ICS website includes a public zone 42a, a private zone 42b and a management zone 42c. The public zone 42a is available to all web users and provides a place for web users to learn of ICS activities, apply for membership or make rapid response requests. The private zone 42b of the website is only available to members of the rating community 16. It provides a secure place for members to use the various services provided to them. The management zone 42c is only available to privilege members such as virtual community managers. Management controls and reports are available to members with privileges to access this zone.

The management zone 42c communicates with a communication management module 42d, a community management module 42e, a project management module 42f, a system management module 42ag, a payment management module 42h, a quality management module 42j as well as an initiative selection module 42i. The quality management module 42j communicates with the quality management subsystem 40 allowing the community manager to invoke quality procedures and perform random quality audits. The payment management module 42h communicates with an accounts payable subsystem and with the ICS database 34. The initiative selection, communication management, community management, project management and system management modules also communicate with the ICS database 34.

The private zone 42b communicates with a member log in module 42k, a member services module 42l, a sign-up registration and training module 42r and an initiative selection module 42i. The member log in, member services, sign-up registration and training and initiative selection modules also communicate with the ICS database 34.

The public zone 42a communicates with a public information area module 42p, a rapid response module 42q and the sign-up registration and training module 42r. The rapid response module 42q communicates with the RRS 22. The sign up registration and training module communicates with the ICS database 34 to add new members to the database and to update members' qualifications based on training.

The communication management modules 42d provides tools for community managers to allow the community managers to see the communication history of members or web users. The communication management module allows a community manager to search messages, generate reports concerning messaging to grow intelligence, post messages to the website and send e-mail messages to members and web users.

The community management module 42e provides community managers with tools to organize and motivate membership. The community management module allows the community manager to put members into and out of virtual communities, update members' profiles, organize members into groups and provide help services.

The initiative selection module 42i includes the initiatives pages on which initiatives are posted. Members, through use of the URT 36a, can select a posted initiative. The initiative selection module also provides the community manager with the tools to assign initiatives to members. The initiatives posted on the initiative pages differ from member to member depending on the initiative rating assigned to the member accessing the initiative pages. Only those initiatives for which the member is qualified are posted. Members may also be required to undergo training before they are able to commence an initiative offered to them on the initiative pages.

The member log in module 42k allows members to connect to the ICS through the website so that initiatives may be selected and member services accessed. Similar to conventional websites, member services include chat rooms, e-mail facilities etc. The member services allows a member to review and update their personal and demographic information as well as review their point account status.

The payment management module 42h creates and manages payment processing schedules, creates detailed report breakdowns, releases held point awards and releases payments. The payment management module can operate automatically to award points to a member upon completion of an initiative. The payment management module can also operate in a manual mode and require input from a manager before awarding points. Point values assigned to various initiatives can be updated by a pay manager. Typically, more difficult or time consuming initiatives are assigned more points than easier initiatives.

The project management module 42f allows a community manager to communicate with members to track the status of projects and generate performance reports.

The public information area module 42p is conventional and includes a number of web pages presenting information concerning the ICS 12 that is accessible by web users.

The quality management module 42j holds the web pages of the QMS while the system management module 42g provides the community manager with the tools to manage the ICS 12.

The rapid response module 42q includes the RRS web page allowing web users to generate rapid response label requests to the RRS and return rapid response labels generated by the RRS.

The sign-up registration and training module 42r provides the means to allow web users to become members and train for initiatives and to allow members to be re-trained or trained for new initiatives. When a web user wishes to become a member, the web user is presented with application and URL forms. Once completed, and URT 36a is downloaded to the web user and the web user is connected to a training initiative. If the web user passes the training initiative, the web user is made a member. The member may be connected to additional training initiatives when an initiative is selected.

As will be appreciated, the system 10 allows qualified members in cyberspace to be perform tasks associated with a distributed work process. Although the system 10 has been particularly described with reference to rating URLs, the URLs of course can be evaluated based on virtual any quantitative and/or subjective criteria subjective. The present invention can also be used in other areas. For example, the system 10 can be used to update or validate information located on an information network. In this case, the system can be used as a call center to download tasks to qualified members over the information network. The qualified members can then perform tasks such as make telephone calls to entities to verify information and return the results to the ICS via the information network.

As will be appreciated, although a preferred embodiment of the present invention has been described, those of skill in the art will appreciate that variations and modifications may be made without departing from the spirit and scope thereof as defined by the appended claims.

We claim:

1. A method of distributing a work process on an information network comprising the steps of:
   contracting members of a virtual community having access to said information network to perform tasks associated with said work process, said members having an interest in said work processes;
   dispatching tasks to said members requiring said members to evaluate information accessible on said information network;
   receiving the evaluations of said members;
   processing the evaluations to perform said work process; and
   monitoring the evaluations received from said members to determine the quality thereof, wherein during said monitoring step, the rate at which members complete said evaluations is measured and compared with a standard, the rate at which evaluations are received from members also be examined to detect steady-state and lengthy non-stop evaluations.

2. The method of claim 1 wherein said stakes require said members to evaluate said information based on predetermined criteria.

3. A method of distributing a work process on an information network comprising the steps of:
   contracting members of a virtual community having access to said information network to perform tasks associated with said work process, said members having an interest in said work process;
   dispatching tasks to said members requiring said members to evaluate information accessible on said information network based on predetermined criteria;
   receiving the evaluations of said members;
   monitoring the evaluations received from said members to determine bias in said evaluations; and
   processing the evaluations to perform said work process.

4. The method of claim 3 wherein during said bias determination, random evaluations of other members are selected to yield a work process histogram and corresponding evaluations of said member are selected to yield a member histogram, said histograms being compared to generate a correlation co-efficient providing a potential indication of bias.

5. The method of claim 4 wherein said correlation co-efficient is computed by solving the equation:

$$r_{jk} = \frac{\text{cov}_{jk}}{\sigma_j \sigma_k}$$

where:

$$\text{cov}_{jk} = \frac{\left( \sum_{i=1}^{n} X_{ij} X_{ik} - \frac{\sum_{i=1}^{n} X_{ij} \sum_{i=1}^{n} X_{ik}}{n} \right)}{(n-1)}$$

and $$\sigma = \sqrt{\frac{\left( \sum_{i=1}^{n} X_i^2 - \frac{\left(\sum_{i=1}^{n} X_i\right)^2}{n} \right)}{n-1}}$$

and where $r_{jk}$ is the correlation coefficient, j refers to work process histogram values and k refers to member histogram values.

6. The method of claim 5 wherein during said bias determination step, said method further includes the steps of:
   calculating positive skew factor (PSF), negative skew factor (NSF), and NSF Delta indicators where PSF is the percentage of evaluations above the average evaluation, NSF is the percentage of evaluations below the average evaluation and NSF Delta is the absolute value of the total number of evaluations minus the NSF; and
   applying said indicators and correlation co-efficient to the rule "If the Correlation is Negative AND (PSF is High OR NSF is High) AND (ABS (NSF (MBR)—NSF (PROJ))) is High then the possibility of Bias is increased" to yield a bias indicator.

7. The method of claim 1 wherein during said monitoring step, evaluations of a member are also compared with evaluations of other members to detect conditions where evaluations of said member are out of tolerance.

8. The method of claim 1 wherein during said monitoring step, evaluations of a member for a task of one work process are also compared with evaluations of other members for a related task but for a different work process to detect conditions where evaluations of said member of said task are diametrically opposed.

9. The method of claim 6 wherein said rule is implemented using fussy logic.

10. A system for distributing a work process on an information network comprising:
   a first subsystem to contrast members of a virtual community having access to said information network to perform tasks associated with said work process, said members having an interest in said work process;
   a second subsystem to dispatch tasks to said members requiring said members to evaluate information accessible on said information network based on predetermined criteria and receive the evaluations of said members;

a quality management subsystem executing a bias determination procedure to monitor the evaluations of said members and detect bias in said evaluations; and a third subsystem to process the evaluations to perform said work process.

11. A system as defined in claim 10 wherein said bias determination procedure selects random evaluations of other members to yield a work process histogram and corresponding evaluations of said member to yield a member histogram, said bias determination procedure comparing said histograms to generate a correlation co-efficient providing a potential indication of bias.

12. A system as defined in claim 11 wherein bias determination procedure computes said correlation co-efficient by solving the equation:

$$r_{jk} = \frac{\text{cov}_{jk}}{\sigma_j \sigma_k}$$

where:

$$\text{cov}_{jk} = \frac{\left(\sum_{i=1}^{n} X_{ij} X_{ik} - \frac{\sum_{i=1}^{n} X_{ij} \sum_{i=1}^{n} X_{ik}}{n}\right)}{(n-1)}$$

and $$\sigma = \sqrt{\frac{\left(\sum_{i=1}^{n} X_i^2 - \frac{\left(\sum_{i=1}^{n} X_i\right)^2}{n}\right)}{n-1}}$$

and where $r_{jk}$ is the correlation coefficient, j refers to work process histogram values and k refers to member histogram values.

13. A system as defined in claim 12 wherein bias determination procedure further calculates positive skew factor (PSF), negative skew factor (NSF), and NSF Delta indicators where PSF is the percentage of evaluations above the average evaluation, NSF is the percentage of evaluations below the average evaluation and NSF Delta is the absolute value of the total number of evaluations minus the NSF; and applies said indicators and correlation co-efficient to the rule "If the Correlation is Negative AND (PSF is High OR NSF is High) AND (ABS (NSF (MBR)—NSF (PROJ))) is High then the possibility of Bias is increased" to yield a bias indicator.

14. The method of claim 2 further comprising the step of providing tools to said members to facilitate performance of said evaluations, said tools being particular to tasks dispatched to said members.

15. The method of claim 2 further comprising the step of prioritizing tasks prior to dispatching said tasks to said members, tasks of a higher priority being dispatched to said members prior to tasks of a lower priority.

16. The method of claim 2 further comprising the step of evaluating members prior to contracting said members to ensure said members are qualified to perform said tasks.

17. The method of claim 16 wherein individuals are tested and personal information is collected before said individuals are admitted as members of said virtual community, at least the personal information being used during said evaluating step to determine if members are qualified.

18. The method of claim 17 further comprising the step of training qualified members prior to contracting said members.

19. The method of claim 2 wherein during said evaluations, embers are required to assign ratings to information on said information network, multiple members being requested to rate the same information, ratings from said members relating to the same information being processed to yield an overall rating for said information.

20. A system for distributing a work process on an information network comprising:

a first subsystem to contract members of a virtual community having access to said information network to perform tasks associated with said work process, said members having an interest in said work process;

a second subsystem to dispatch tasks to said members requiring said members to evaluate information accessible on said information network based on predetermined criteria and receive the evaluations of said members;

a third subsystem to process the evaluations to perform said work process; and a quality management subsystem monitoring the evaluations of said members to determine the quality thereof, said quality management subsystem including a plurality of quality procedures, each of said quality procedures monitoring evaluations of members based on differing criteria to detect a specific quality issue, said quality procedures include an anti-spamming procedure comparing the rate at which members complete said evaluations with a standard to detect steady-state and lengthy non-stop evaluations.

21. A system as defined in claim 13 wherein fuzzy logic is used to implement said rule.

22. A system as defined in claim 20 wherein said quality procedures include a rate evaluation procedure measuring the rate at which said members complete said evaluations and comparing the rate with a threshold to detect conditions where evaluations are made too quickly to yield quality results.

23. A system as defined in claim 20 wherein said quality procedures include a procedure comparing evaluations of a member with evaluations of other members to detect conditions where evaluations of said member are out of tolerance.

24. A system as defined in claim 20 wherein said quality procedures include a bias determination procedure to detect members exhibiting a bias during evaluations.

25. A system as defined in claim 24, wherein said bias determination procedure selects random evaluations of other members to yield a work process histogram and corresponding evaluations of said members to yield a member histogram, said bias determination procedure comparing said histograms to generate a correlation co-efficient providing a potential indication of bias.

26. A system as defined in claim 25 wherein bias determination procedure computes said correlation co-efficient by solving the equation:

$$r_{jk} = \frac{\text{cov}_{jk}}{\sigma_j \sigma_k}$$

where:

$$\mathrm{cov}_{jk} = \frac{\left(\sum_{i=1}^{n} X_{ij} X_{ik} - \frac{\sum_{i=1}^{n} X_{ij} \sum_{i=1}^{n} X_{ik}}{n}\right)}{(n-1)}$$

and $$\sigma = \sqrt{\frac{\left(\sum_{i=1}^{n} X_i^2 - \frac{\left(\sum_{i=1}^{n} X_i\right)^2}{n}\right)}{n-1}}$$

and where $r_{jk}$ is the correlation coefficient, j refers to work process histogram values and k refers to member histogram values.

27. A system as defined in claim 26 wherein bias determination procedure further calculates positive skew factor (PSF), negative skew factor (NSF), and NSF Delta indicators where PSF is the percentage of evaluations above the average evaluation, NSF is the percentage of evaluations below the average evaluation and NSF Delta is the absolute value of the total number of evaluations minus the NSF; and applies said indicators and correlation co-efficient to the rule "If the Correlation is Negative AND (PSF is High OR NSF is High) AND (ABS (NSF (MBR)—NSF (PROJ))) is High then the possibility of Bias is increased" to yield a bias indicator.

28. A system as defined in claim 27 wherein fuzzy logic is used to implement said rule.

29. A system as defined in claim 20 wherein said second subsystem downloads tools to said members to facilitate performance of said evaluations, said tools being particular to tasks dispatched to said members.

30. A system as defined in claim 20 wherein said second subsystem prioritizes tasks prior to dispatching said tasks to said members, tasks of a higher priority being dispatched to said members prior to tasks of a lower priority.

31. A system as defined in claim 20 wherein said first subsystem evaluates members prior to contracting said members to ensure said members are qualified to perform said tasks.

32. A system as defined in claim 31 further comprising a fourth subsystem to test individuals and collect personal information thereof before admitting said individuals as members of said virtual community, at least the personal information being used by said first subsystem to determine if members are qualified.

33. A system as defined in claim 32 wherein said fourth subsystem trains qualified members prior to enabling said first subsystem to contract said members.

34. A system as defined in claim 20 said second subsystem dispatches the same task to multiple members with instructions to assign ratings to information on said information network, said third subsystem processing the ratings received from the members to yield an overall rating for said information.

35. A system as defined in claim 34 wherein said tasks involve assigning ratings to pages on websites indentified by uniform resource locators (URLs).

36. A method for assigning a generic rating to a directory containing a plurality of documents comprising the steps of:

evaluating documents in said directory one at a time and assigning rating values to said documents;

as said rating values are assigned to said documents, comparing said rating values; and if said rating values are the same and after a predetermined percentage of the total number of documents in said directory have been evaluated, assigning a generic rating value to said directory that is the same as said rating values and ending the document evaluation.

37. The method of claim 36 further comprising the step of removing said generic value from said directory if a document therein is assigned a rating value at a later date that is different from said generic value.

38. The method of claim 37 wherein said predetermined percentage is greater than or equal to 10%.

* * * * *